US008422109B2

(12) United States Patent
Terada et al.

(10) Patent No.: US 8,422,109 B2
(45) Date of Patent: Apr. 16, 2013

(54) OPTICAL REFLECTION ELEMENT

(75) Inventors: Jirou Terada, Osaka (JP); Shinsuke Nakazono, Osaka (JP); Shigeo Furukawa, Osaka (JP); Kazuki Komaki, Osaka (JP)

(73) Assignee: Panasonic Corporation, Osaka (JP)

( * ) Notice: Subject to any disclaimer, the term of this patent is extended or adjusted under 35 U.S.C. 154(b) by 349 days.

(21) Appl. No.: 12/811,592

(22) PCT Filed: Jan. 29, 2009

(86) PCT No.: PCT/JP2009/000341
§ 371 (c)(1),
(2), (4) Date: Jul. 2, 2010

(87) PCT Pub. No.: WO2009/096182
PCT Pub. Date: Aug. 6, 2009

(65) Prior Publication Data
US 2010/0296147 A1 Nov. 25, 2010

(30) Foreign Application Priority Data

| Jan. 31, 2008 | (JP) | 2008-020470 |
| Feb. 18, 2008 | (JP) | 2008-035587 |
| Feb. 19, 2008 | (JP) | 2008-036819 |
| Apr. 30, 2008 | (JP) | 2008-118261 |

(51) Int. Cl.
*G02B 26/08* (2006.01)
(52) U.S. Cl.
USPC ...................... 359/224.1; 359/904
(58) Field of Classification Search .... 359/198.1–199.4, 359/200.6–200.8, 202.1, 221.2, 223.1–225.1, 359/226.2, 904, 290–295, 838, 846, 871, 359/872; 250/204, 559.06, 559.29, 230, 250/234; 347/255–260; 353/39, 98–99; 385/15–18, 22; 398/12, 19, 45
See application file for complete search history.

(56) References Cited

U.S. PATENT DOCUMENTS

| 6,608,714 B2 * | 8/2003 | Hanson et al. | 359/296 |
| 2007/0058238 A1 * | 3/2007 | Mala et al. | 359/291 |
| 2007/0070481 A1 | 3/2007 | Nishikawa et al. | |

FOREIGN PATENT DOCUMENTS

| JP | 58-105213 | 6/1983 |
| JP | 06-046207 | 2/1994 |

(Continued)

OTHER PUBLICATIONS

International Search Report for International Application No. PCT/JP2009/000341, Feb. 24, 2009, Panasonic Corporation.

*Primary Examiner* — Jennifer L. Doak
(74) *Attorney, Agent, or Firm* — RatnerPrestia

(57) ABSTRACT

An optical reflection device includes a mirror having a reflection surface configured to reflect light, a first support beam connected to the mirror, a tuning fork vibrator connected to the first support beam, a second support beam connected to the tuning fork vibrator, and a supporter connected to the second support beam. The first support beam has a first end connected to the mirror and a second end located on an opposite side to the first end, and extends along a center axis. The tuning fork vibrator includes a joining portion connected to the second end of the first support beam, a first arm extending from the first joining portion while separated from the first center axis, and a second arm extending from the first joining portion symmetrically to the first arm about the first center axis. The second support beam has a third end connected to the joining portion of the tuning fork vibrator and a fourth end located on an opposite side to the third end, and extends along the first center axis.

24 Claims, 20 Drawing Sheets

FOREIGN PATENT DOCUMENTS

| | | |
|---|---|---|
| JP | 07-218857 | 8/1995 |
| JP | 09-185000 | 7/1997 |
| JP | 11-281908 | 10/1999 |
| JP | 2005-148459 A | 6/2005 |
| JP | 2005-275198 A | 10/2005 |
| JP | 2008-020701 A | 1/2008 |

* cited by examiner

OPTICAL REFLECTION ELEMENT

This application is a U.S. National Phase application of PCT International Application PCT/JP2009/000341.

TECHNICAL FIELD

The present invention relates to an optical reflection device that reflects and sweeps light at a high speed.

BACKGROUND ART

Patent Document 1 discloses a conventional optical reflection device that is used in, e.g. a laser printer. The conventional optical reflection device includes a polygon mirror including a polygonal rotating body and mirrors provided on side surfaces of the rotating body. The polygon mirror rotates to sweep laser beam on a scan surface of a photosensitive drum.

Optical reflection devices have been demanded to have s small size as color laser printers have been put widely in the market and had a small size. In the conventional optical reflection device including the polygon mirror, the polygon mirror can hardly have a small size, and a driving device that drives the polygon mirror is separately required, hence preventing the conventional optical reflection device from having a small size.

Patent Document 1: JP11-281908A

SUMMARY OF THE INVENTION

An optical reflection device includes a mirror having a reflection surface configured to reflect light, a first support beam connected to the mirror, a tuning fork vibrator connected to the first support beam, a second support beam connected to the tuning fork vibrator, and a supporter connected to the second support beam. The first support beam has a first end connected to the mirror and a second end located on an opposite side to the first end, and extends along a center axis. The tuning fork vibrator includes a joining portion connected to the second end of the first support beam, a first arm extending from the first joining portion while separated from the first center axis, and a second arm extending from the first joining portion symmetrically to the first arm about the first center axis. The second support beam has a third end connected to the joining portion of the tuning fork vibrator and a fourth end located on an opposite side to the third end, and extends along the first center axis. The supporter is connected to the fourth end of the second support beam.

The optical reflection device can have a small size.

REFERENCE NUMERALS

2A Reflection Surface
3 Support Beam (First Support Beam)
4 Tuning Fork Vibrator (First Tuning Fork Vibrator)
5 Support Beam (Second Support Beam)
6 Supporter (First Supporter)
7 Joining Portion (First Joining Portion)
8 Arm (First Arm)
9 Arm (Second Arm)
11 Driver Element
22 Monitor Element
26 Tuning Fork Vibrator (Third Tuning Fork Vibrator)
27 Support Beam
28 Support Beam
30 Joining Portion (Third Joining Portion)
31 Arm (Fifth Arm)
32 Arm (Sixth Arm)
34 Meander Vibrating Beam
44 Vibrating Beam
92 Mirror
93 Monitor Element
103 Support Beam
104 Tuning Fork Vibrator (Second Tuning Fork Vibrator)
105 Support Beam
107 Joining Portion (Second Joining Portion)
108 Arm (Third Arm)
109 Arm (Fourth Arm)
111 Driver Element
126 Tuning Fork Vibrator (Fourth Tuning Fork Vibrator)
127 Support Beam
128 Support Beam
130 Joining Portion (Fourth Joining Portion)
131 Arm (Seventh Arm)

132 Arm (Eighth Arm)
203 Support Beam
205 Support Beam
303 Support Beam
305 Support Beam
403 Support Beam
405 Support Beam
S1 Center Axis (First Center Axis)
S2 Center Axis (Second Center Axis)

DETAIL DESCRIPTION OF PREFERRED
EMBODIMENTS

Exemplary Embodiment 1

Figure 1:
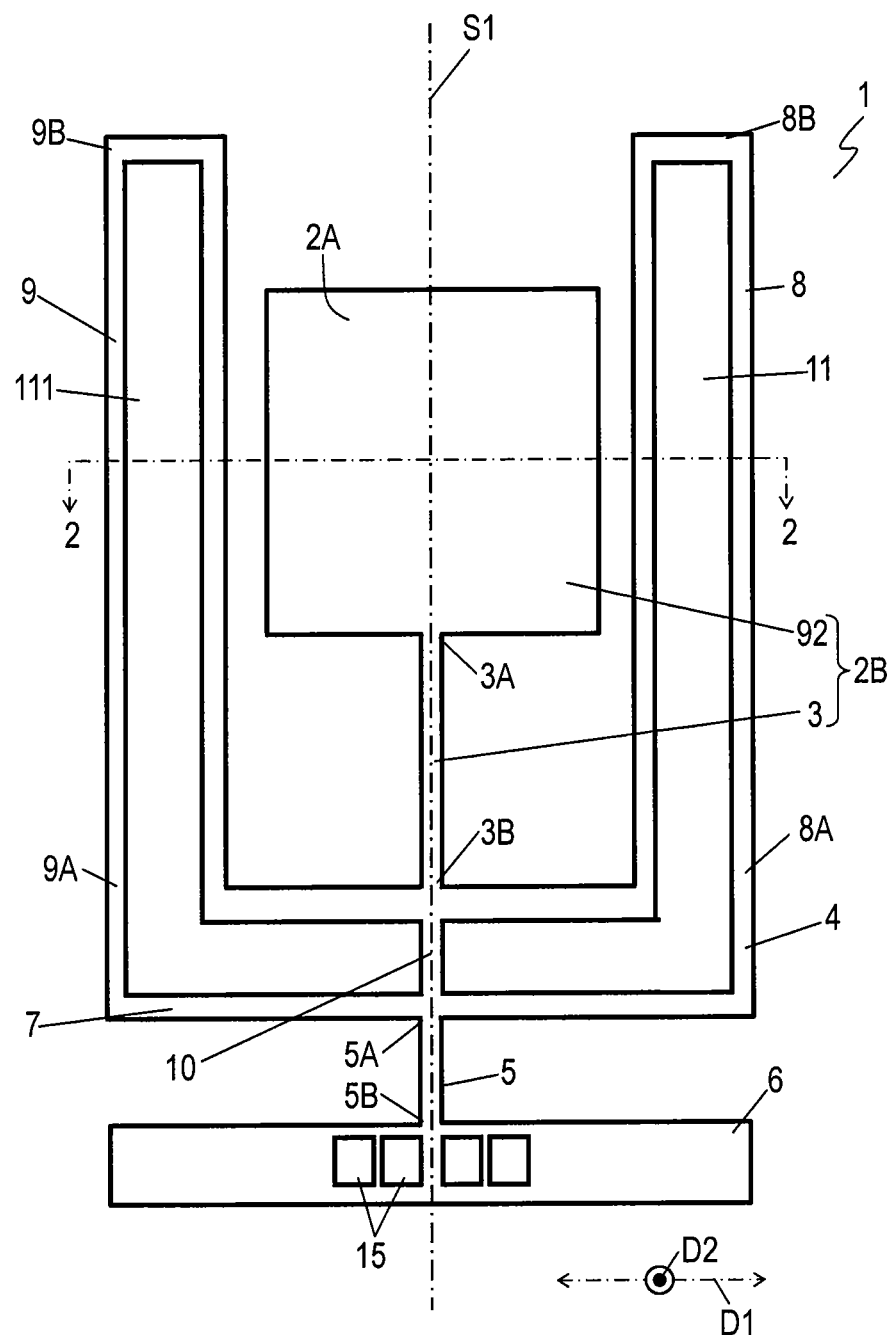
FIG. 1 is a plan view of an optical reflection device according to Exemplary Embodiment 1 of the present invention.

FIG. 1 is a plan view of an optical reflection device according to Exemplary Embodiment 1. Optical reflection device 1 includes mirror 92, support beam 3 having end 3A connected to mirror 92, tuning fork vibrator 4 connected to end 3B of support beam 3, support beam 5 having end 5A connected to tuning fork vibrator 4, and supporter 6 connected to end 5B of support beam 5. Support beams 3 and 5 have linear shapes extending along center axis S1. Ends 3A, 3B, 5A, and 5B are located on center axis S1. Ends 3A end 5A are located opposite to ends 3B and 5B along center axis S1. That is, ends 3A and 5A are located opposite to ends 3B and 5B in a direction of center axis S1.

Tuning fork vibrator 4 has a tuning fork shape including joining portion 7 and arms 8 and 9. Joining portion 7 is located on center axis S1. Arms 8 and 9 extend substantially in parallel with center axis S1 from joining portion 7. Arms 8 and 9 have linear shapes having ends 8A and 9A connected to joining portion 7, and ends 8B and 9B located opposite to ends 8A and 9A in the direction of center axis S1, respectively. Nothing is connected to ends 8B and 9B, and thus, ends 8B and 9B are free ends that are opened. Arms 8 and 9 are arranged in direction D1 perpendicular to center axis S1 while separated from center axis S1. Arms 8 and 9 are symmetrically to each other about center axis S1. Mirror 92 is located between arms 8 and 9. Driver elements 11 and 111 are provided on arms 8 and 9, respectively. Driver elements 11 and 111 warp and vibrate arms 8 and 9, thereby vibrating tuning fork vibrator 4. Joining portion 7 of tuning fork vibrator 4 is connected to supporter 6 via support beam 5 provided between joining portion 7 and supporter 6. Joining portion 7 is movable with respect to supporter 6. Tuning fork vibrator 4 has a shape symmetrical about center axis S1.

Support beams 3 and 5 are fixed to vibration center 10 of tuning fork vibrator 4 located at joining portion 7. Support beams 3 and 5 have the same resonant frequencies, hence twisting and vibrating efficiently.

Figure 2:
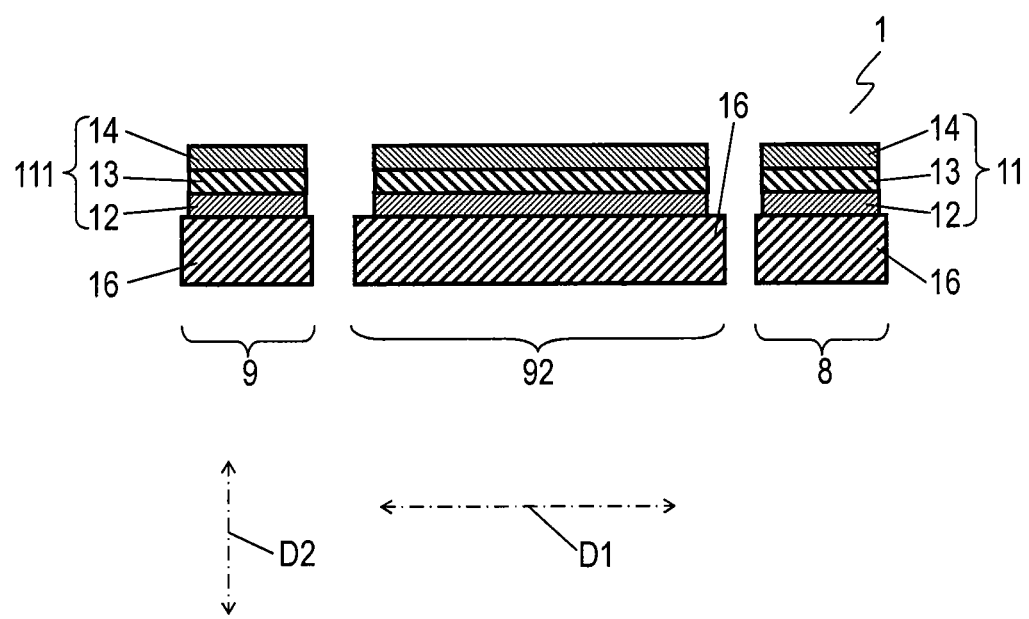
FIG. 2 is a sectional view of the optical reflection device on line 2-2 shown in FIG. 1.

FIG. 2 is a sectional view of optical reflection device 1 online 2-2 shown in FIG. 1. Driver element 11 (111) includes lower electrode layer 12 provided on base material 16 constituting arm 8 (9), piezoelectric layer 13 provided on lower electrode layer 12, and upper electrode layer 14 provided on piezoelectric layer 13. Base material 16, lower electrode layer 12, piezoelectric layer 13, and upper electrode layer 14 are arranged in direction D2 perpendicular to center axis S1 and direction D1. Lower electrode layer 12 and upper electrode layer 14 are made of conductive material. Piezoelectric layer 13 is made of piezoelectric material. Lower electrode layer 12 may be grounded. Lower electrode layer 12 and upper electrode layer 14 are connected to plural connection terminals 15 shown in FIG. 1 through lead lines. Alternating-current (AC) voltages having reverse polarities can be applied to driver elements 11 and 111 via plural connection terminals 15.

As illustrated in FIG. 1, driver elements 11 and 111 may extend from arms 8 and 9 to joining portion 7. This structure allows driver elements 11 and 111 to have large areas, and accordingly warps and vibrates arms 8 and 9 largely to vibrate tuning fork vibrator 4 efficiently. Even if driver elements 11 and 111 extend to joining portion 7, upper electrode layers 14 of driver elements 11 and 111 are electrically disconnected at vibration center 10 of joining portion 7 to apply the AC voltages having the reverse polarities to driver elements 11 and 111.

Lower electrode layer 12, piezoelectric layer 13, and upper electrode layer 14 are formed by a thin-film process, such as a sputtering, to allow driver elements 11 and 111 and tuning fork vibrator 4 to be thin. Thicknesses of arms 8 and 9 and joining portion 7 in direction D2 perpendicular to center axis S1 of tuning fork vibrator 4 and direction D1 are smaller than widths of arms 8 and 9 in direction D1 so as to increase amplitude of vibration of arms 8 and 9, providing small optical reflection device 1.

A resonant frequency of tuning fork vibrator 4 is designed to be substantially equal to a resonant frequency of a twisting vibrator including mirror 92 and support beam 3 so as to allow repetitive rotational vibration of mirror 92 about center axis S1 to be efficiently performed.

The widths of arms 8 and 9 in direction D1 are equal to the width of joining portion 7 in the direction of center axis S1 to suppress an unnecessary vibration mode. Tuning fork vibrator 4 has a U-shape to further suppress the unnecessary vibration mode.

Support beams 3 and 5 may preferably have circular sections in a direction perpendicular to center axis S1, that is, may have cylindrical shapes. The vibration modes of the twisting vibrations of support beams 3 and 5 are stabilized to suppress unnecessary resonance, preventing optical reflection device 1 from being influenced by disturbance vibration.

Materials of optical reflection device 1 according to Embodiment 1 will be described below.

Base material 16 constituting tuning fork vibrator 4, support beams 3 and 5, and supporter 6 of optical reflection device 1 is preferably made of elastic material, such as metal, glass, or ceramic substrate, which have elastic strength, mechanical strength, and high Young's modulus in view of productivity. The elastic material can be preferably, metal, crystal, glass, quartz, or ceramic material in view of mechanical properties and availability. Silicon, titanium, stainless steel, elinvar, and brass alloy can be used as the metal, allowing optical reflection device 1 to have excellent vibration properties and to be processed easily.

Piezoelectric layers 13 of driver elements 11 and 111 can be made of piezoelectric material, such as lead zirconate titanate (PZT), which has a high piezoelectric constant. Platinum having a lattice constant close to that of the piezoelectric material of piezoelectric layer 13 is used as lower electrode layer 12. Upper electrode layer 14 may include a lower metallic layer that is provided on piezoelectric layer 13, and an upper metallic layer that is provided on the lower metallic layer and made of metal different from metal of the lower metallic layer. The lower metallic layer is made of titanium and the upper metallic layer is made of gold. The lower metallic layer can adhere securely to piezoelectric layer 13 made of piezoelectric material, such as PZT. The lower metallic layer may be made of chromium instead of titanium. The lower metallic layer adheres securely to piezoelectric layer 13. The lower metallic layer and the upper electrode layer made of gold form a strong diffusion layer, providing rigid driver elements 11 and 111.

Lower electrode layer 12, piezoelectric layer 13, and upper electrode layer 14 can be formed by a thin-film process, such as a sputtering technique. Driver elements 11 and 111 are formed on the same surface of tuning fork vibrator 4 in view of productivity.

Mirror 92 has reflection surface 2A that is parallel to center axis S1. Reflection surface 2A is configured to reflect light, and reflection surface 2A can be formed by mirror-polishing a surface of base material 16. Reflection surface 2A can be provided by forming metallic thin film, such as gold or aluminum, which has a high reflectance on base material 16. The metallic thin film can be formed by a sputtering technique during the process for making driver elements 11 and 111.

Plural optical reflection devices 1 can be manufactured accurately at once from wafer base material 16 by a thin film process and a semiconductor process, such as a photolithographic technique. This process allows small optical reflection device 1 to be produced efficiently and accurately.

Support beams 3 and 5, tuning fork vibrator 4, and base material 16 of mirror 92 are made of the same material, hence providing optical reflection devices 1 having stable vibration properties and excellent productivity.

A method for producing optical reflection device 1 according to Embodiment 1 will be described below.

A silicon wafer constituting base material 16 is prepared. Lower electrode layer 12 made of platinum is formed on the silicon wafer by a thin film process, such as a sputtering method or an evaporation method. The silicon wafer can be thick, and has a thickness of 0.3 mm according to Embodiment 1. This thickness allows a silicon wafer to have a large size without warping to accurately and efficiently produce optical reflection device 1.

Then, piezoelectric layer 13 is formed on lower electrode layer 12 by the sputtering method. In this case, an orientation control layer that controls a crystalline orientation of piezoelectric layer 13 can be provided between piezoelectric layer 13 and lower electrode layer 12. The orientation control layer is preferably made of dielectric oxide material containing Pb and Ti, and more preferably made of lanthanum-magnesium added lead titanate (PLMT). The orientation control layer improves crystalline orientation of piezoelectric layer 13 to provide driver element 11 with excellent piezoelectric properties.

Then, upper electrode layer 14 made of titanium and gold is formed on piezoelectric layer 13. As described above, upper electrode layer 14 includes the lower metallic layer that is provided on piezoelectric layer 13 and made of titanium, and the upper metallic layer that is provided on the lower metallic layer and made of gold. Piezoelectric layer 13 and upper electrode layer 14 containing gold form the strong diffusion layer, providing driver element 11 with large strength. According to Embodiment 1, lower electrode layer 12 has a thickness of 0.2 µm, piezoelectric layer 13 has a thickness of 3.5 µm, the lower metallic layer has a thickness of 0.01 µm, and the upper metallic layer has the thickness of 0.3 µm.

Then, lower electrode layer 12, piezoelectric layer 13, and upper electrode layer 14 are etched to form driver elements 11 and 111 by a photolithographic technique. According to Embodiment 1, upper electrode layer 14 is etched with mixture solution containing iodine/potassium iodide mixture solution and ammonium hydroxide and hydrogen peroxide mixture solution. Lower electrode layer 12 and piezoelectric layer 13 are etched by one of a dry etching method and a wet etching method or by both of the dry etching method and the wet etching method. Fluorocarbon-based etching gas or $SF_6$ gas can be used in the dry etching method. Piezoelectric layer 13 is subjected to the wet etching with etching solution of mixture solution containing hydrofluoric acid, nitric acid, and hydrogen peroxide. Then, lower electrode layer 12 is etched to form driver elements 11 and 111 by the dry etching method.

Then, the silicon wafer is subjected to isotropic dry etching with $XeF_2$ gas to remove an unnecessary portion of the silicon wafer, thereby providing optical reflection device 1 shown in FIG. 1.

In order to dry-etch the silicon wafer accurately with the anisotropy thereof, the wafer is preferably etched more linearly with using etching gas, such as $SF_6$ gas which facilitates the etching, and etching suppression gas, such as $C_4F_8$ gas which suppresses the etching. The silicon wafer can be etched with mixture gas containing the etching gas and the etching suppression gas. The silicon wafer can be etched with using the etching promotion gas and the etching suppression gas alternately.

The above-mentioned manufacturing method provides small and precise optical reflection devices 1 at once.

In optical reflection device 1 according to Embodiment 1 produced by the above-production process, each of arms 8 and 9 has a length of 1.0 mm in the direction of center axis S1 and the width of 0.3 mm in direction D1. Support beam 3 has a length of 0.2 mm in the direction of center axis S1 and the width of 0.1 mm in direction D1. Support beam 5 has a length of 0.4 mm in the direction of center axis S1 and the width of 0.1 mm in direction D1. Mirror 92 has a size of 1.0 mm by 1.0 mm, that is, the length of 1.0 mm in the direction of center axis S1 and the width of 1.0 mm in direction D1. In optical reflection device 1, mirror 92 vibrates at a frequency of 22 kHz and turns about center axis S1 by an angle of ±10 degrees.

An operation of optical reflection device 1 will be described below.

Figure 3:
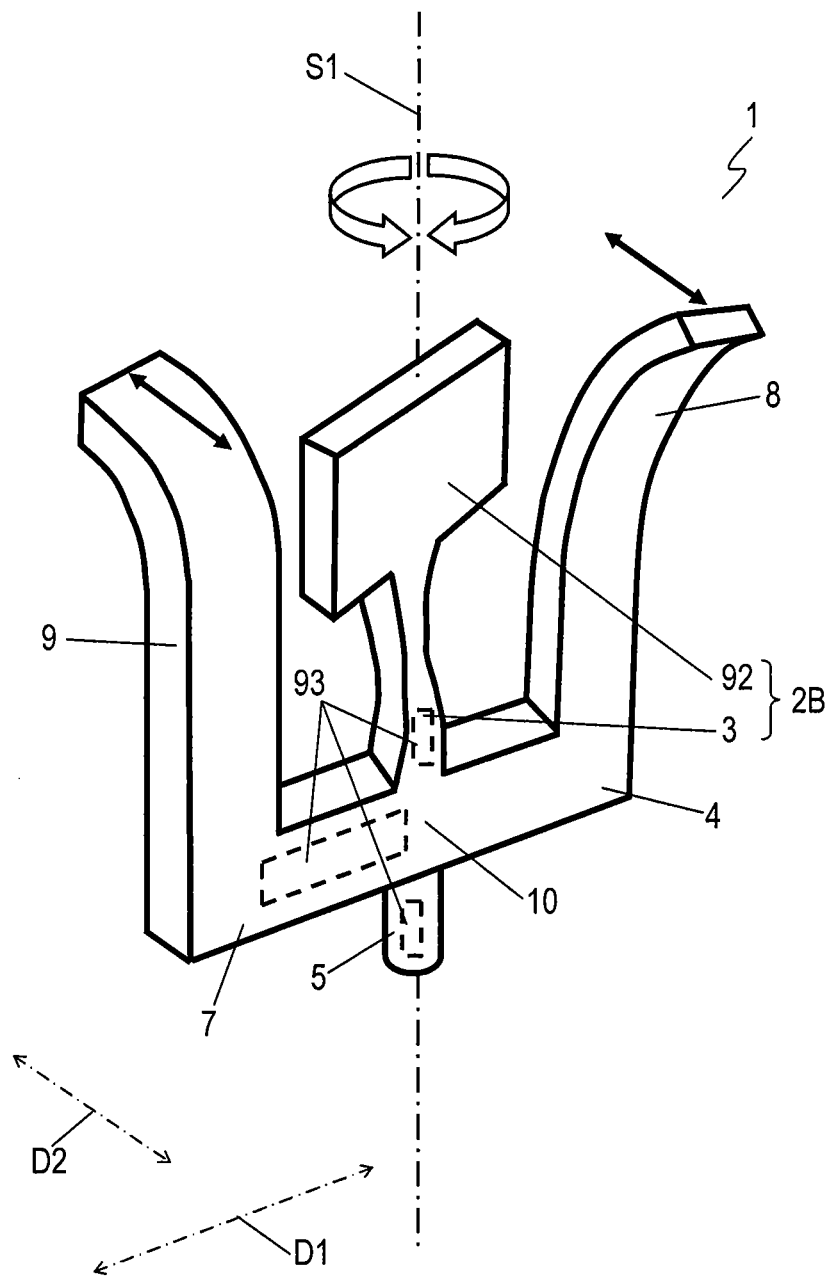
FIG. 3 is a perspective view of the optical reflection device according to Embodiment 1 for illustrating an operation of the optical reflection device.

FIG. 3 is a perspective view of optical reflection device 1 for illustrating an operation of optical reflection device 1. Driver elements 11 and 111 (piezoelectric layer 13) deform to expand and contract along arms 8 and 9 by applying the AC voltages between lower electrode layers 12 and upper electrode layers 14 of driver elements 11 and 111. The deformation of driver elements 11 and 111 warps and vibrates arms 8 and 9. The AC voltages having the reverse polarities are applied to the driver elements 11 and 111 reversely displace arms 8 and 9 in direction D2 to warp and vibrate arms 8 and 9.

The vibration of arms 8 and 9 propagate to joining portion 7, and causes tuning fork vibrator 4, in particular joining portion 7 to generate the repetitive rotational vibration about center axis S1 passing through vibration center 10. In the repetitive rotational vibration, the rotating direction is inverted at a predetermined frequency.

The repetitive rotational vibration propagates to support beam 3 coupled to joining portion 7, and causes support beam 3 to generate the twisting vibration about center axis S1. This causes twisting vibrator 2B constituted by support beam 3 and mirror 92 to generate the twisting vibration about center axis S1, thereby causing mirror 92 to generate the repetitive rotational vibration about center axis S1. Twisting vibrator 2B (support beam 3 and mirror 92) is twisted about center axis S1 in a direction opposite to a direction in which tuning fork vibrator 4 is twisted.

Laser beam enters from a light source onto mirror 92 generating the repetitive rotational vibration about center axis S1, and is reflected on reflection surface 2A of mirror 92 of optical reflection device 1 so as to irradiate a screen and scan the screen.

In optical reflection device 1 shown in FIGS. 1 and 3, driver elements 11 and 111 are provided on arms 8 and 9 to generate the repetitive rotational vibration in tuning fork vibrator 4, respectively. Arms 8 and 9 are joined to each other via joining portion 7 that is movable with respect to supporter 6. When one of arms 8 and 9 vibrates, the vibration propagates to the other of arms 8 and 9 through joining portion 7. Therefore, Optical reflection device 1 according to Embodiment 1 may not necessarily include both driver elements 11 and 111.

In optical reflection device 1 according to Embodiment 1, the warping vibration is generated in arms 8 and 9 of tuning fork vibrator 4 to generate the twisting vibration of vibrator 2B including support beam 3 and mirror 92, thereby causing mirror 92 to generate the repetitive rotational vibration 92 about center axis S1. Thus, mirror 92 can be vibrated by a small driving source that is tuning fork vibrator 4, accordingly allowing optical reflection element 1 to have a small size.

In optical reflection device 1 according to Embodiment 1, respective tips of arms 8 and 9 of tuning fork vibrator 4 are free ends which are opened. This structure increases a twisting angle of mirror 92 efficiently even if optical reflection device 1 is small.

The vibrating source is tuning fork vibrator 4 that has the tuning fork shape having a high Q factor, and provides the vibration having large amplitude even with small energy, hence providing small optical reflection device 1.

Tuning fork vibrator 4 can be designed appropriately to largely change a reflection angle of reflection surface 2A of mirror 92, hence sweeping the incident laser beam on a predetermined range of the screen.

As illustrated in FIG. 3, optical reflection device 1 may further include monitor element 93 that outputs a signal changing according to the vibration of tuning fork vibrator 4. Similarly to driver elements 11 and 111, monitor element 93 includes the lower electrode layer, the piezoelectric layer, and the upper electrode layer. The vibration of mirror 92 can be accurately controlled through a feedback circuit to accurately and stably drive optical reflection device 1 by applying, to driver elements 11 and 111, driving signals according to the signal outputted from monitor element 93.

Monitor element 93 may be provided on joining portion 7 having a relatively large area. Monitor element 93 is preferably provided on joining portion 7 asymmetrically about vibration center 10. If monitor element 93 is symmetrical about vibration center 10, the signal generated by monitor element 93 is canceled in monitor element 93, hence preventing the vibration of tuning fork vibrator 4 from being detected efficiently.

Monitor element 93 may be provided on support beam 3 or 5. In this case, monitor element 93 is preferably asymmetrical about center axis S1. When monitor elements 93 is symmetrical about center axis S1, the signal generated by monitor element 93 is canceled in monitor element 93, hence preventing the vibration of tuning fork vibrator 4 from being detected efficiently.

If the vibration of mirror 92 is detected with a small time delay, monitor element 93 is preferably provided on support beam 3 that is closer to mirror 92 than support beam 5 is. If wiring from monitor element 93 is as short as possible, monitor element 93 is preferably provided on support beam 5 that is closer to supporter 6 than support beam 3 is.

Figure 4:
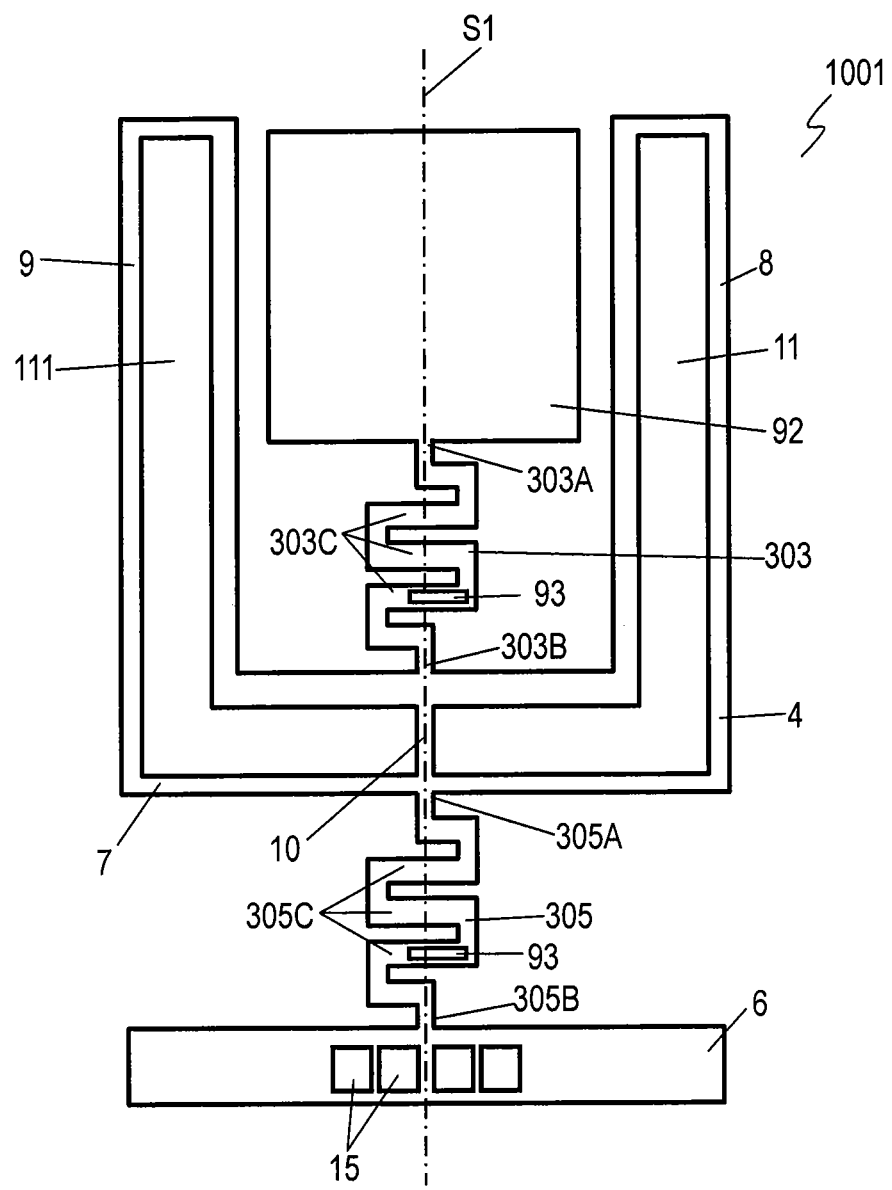
FIG. 4 is a plan view of another optical reflection device according to Embodiment 1.

FIG. 4 is a plan view of another optical reflection device 1001 according to Embodiment 1. In FIG. 4, components identical to those of optical reflection device 1 shown in FIGS. 1 to 3 are denoted by the same reference numeral, and their description will be omitted. Optical reflection device 1001 shown in FIG. 4 includes support beams 303 and 305 instead of support beams 3 and 5. Support beam 303 has end 303A that is connected to mirror 92 and end 303B that is connected to joining portion 7 of tuning fork vibrator 4. Support beam 305 has end 305A that is connected to joining portion 7 of tuning fork vibrator 4 and end 305B that is connected to supporter 6. Support beams 303 and 305 have meander shapes extending from ends 303A and 305A to ends 303B and 305B along center axis S1, respectively. Ends 303A and 305A are located on opposite sides to ends 303B and 305B along center axis S1, respectively. That is, ends 303A and 305A are located on the opposite sides to ends 303B and 305B in the direction of center axis 51, respectively. Since support beams 303 and 305 have the meander shapes, support beams 303 and 305 have the resonant frequency lower than that of support beams 3 and 5 having the linear shapes shown in FIG. 1, and turn and vibrate mirror 92 with larger amplitude.

Gravity centers of support beams 303 and 305 are located preferably on center axis S1. This structure suppresses unnecessary vibration of mirror 92, and allows optical reflection device 1001 to accurately have the light scan. Support beams 303 and 305 are fixed to vibration center 10 of tuning fork vibrator 4 located at joining portion 7. Support beams 303 and 305 have the same resonant frequency, hence twisting and vibrating efficiently.

Support beams 303 and 305 having the meander shapes vibrate with large amplitude, accordingly allowing monitor element 93 on support beam 303 or 305 to accurately detect the vibration of mirror 92. Support beam 303 having the meander shape includes portion 303C perpendicular to center axis S1. Support beam 305 having the meander shape includes portion 305C perpendicular to center axis S1. Since portion 303C vibrates with the largest amplitude in support beam 303, monitor element 93 provided on portion 303C can efficiently detect the signal according to the vibration of support beam 303. Similarly, since portion 305C vibrates with the largest amplitude in support beam 305, monitor element 93 provided on portion 305C can efficiently detect the signal according to the vibration of support beam 305.

Optical reflection device 1001 shown in FIG. 4 includes support beams 303 and 305 having the meander shapes. Optical reflection device 1001 according to Embodiment 1 may include support beam 3 having the linear shape shown in FIG. 1 instead of support beam 303. Optical reflection device 1001 according to Embodiment 1 may include support beam 5 having the linear shape shown in FIG. 1 instead of support beam 305.

Figure 5:
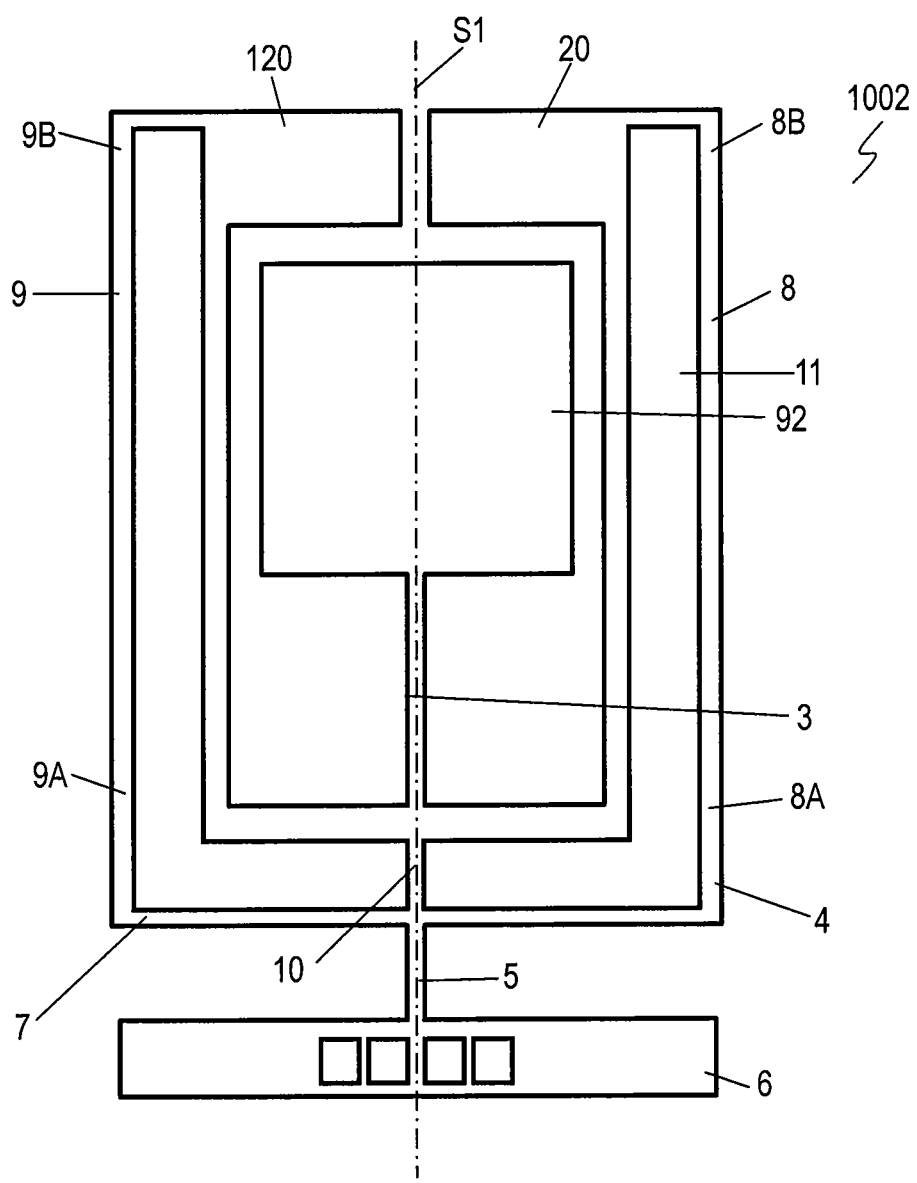
FIG. 5 is a plan view of still another optical reflection device according to Embodiment 1.

FIG. 5 is a plan view of still another optical reflection device 1002 according to Embodiment 1. In FIG. 5, components identical to those of optical reflection device 1 shown in FIG. 1 are denoted by the same reference numerals, and their description will be omitted. Tuning fork vibrator 4 of optical reflection device 1002 further include projections 20 and 120 extending from ends 8B and 9B of arms 8 and 9 in tuning fork vibrator 4 of optical reflection device 1, respectively. Projections 20 and 120 function as weights to lower the resonant frequencies of arms 8 and 9, thereby increasing the amplitude of the vibration of twisting vibrator 2B constituted by support beam 3 and mirror 92. Projections 20 and 120 may extend toward center axis S1 from ends 8B and 9B of arms 8 and 9, respectively. In this case, mirror 92 is surrounded by joining portion 7, arms 8 and 9, and projections 20 and 120. This structure efficiently generates warping vibration in arms 8 and 9, and allows an area necessary for installing optical reflection device 1002 to be substantially identical to that of optical reflection device 1 shown in FIG. 1.

Exemplary Embodiment 2

Figure 6:
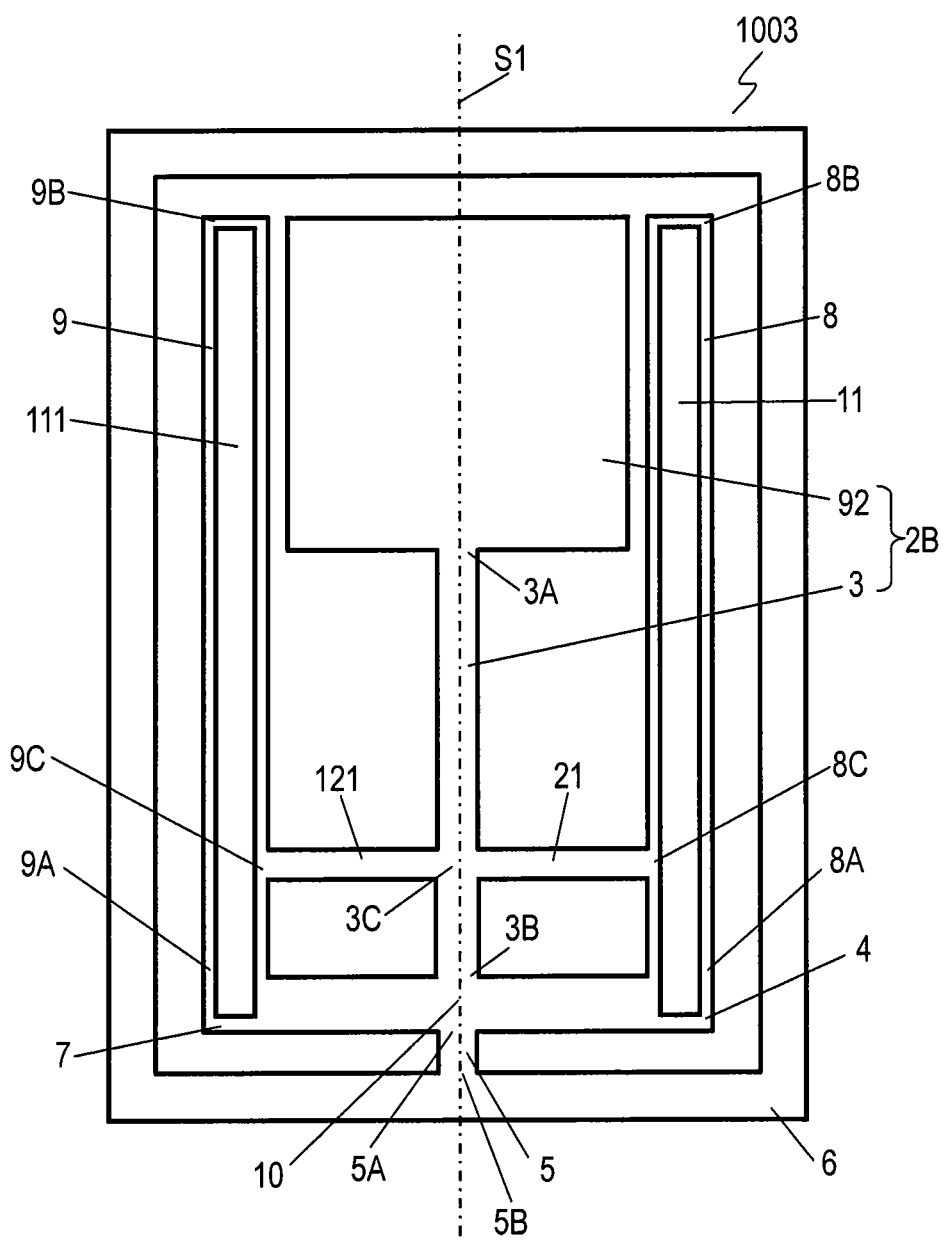
FIG. 6 is a plan view of an optical reflection device according to Exemplary Embodiment 2 of the invention.

FIG. 6 is a plan view of optical reflection device 1003 according to Exemplary Embodiment 2. In FIG. 6, components identical to those of reflection device 1 shown in FIG. 1 are denoted by the same reference numerals, and their description will be omitted. Optical reflection device 1003 of FIG. 6 further includes support bar 21 extending from support beam 3 to arm 8 and support bar 121 extending from support beam 3 to arm 9. Support bar 21 extends perpendicularly to center axis S1 from position 3C between ends 3A and 3B of support beam 3 to position 8C between ends 8A and 8B of arm 8. Support bar 121 extends perpendicularly to center axis S1 from position 3C between ends 3A and 3B of support beam 3 to position 9C between ends 9A and 9B of arm 9. Support bars 21 and 121 have linear shapes. The vibration of arms 8 and 9 propagates to support beam 3 not only via joining portion 7 but also via support bars 21 and 121. This structure transmit allows energy of the repetitive rotational vibration of tuning fork vibrator 4 to support beam 3 via joining portion 7 and support bars 21 and 121, hence efficiently rotating mirror 92 repetitively.

Twisting vibrator 2B including support beam 3 and mirror 92 vibrates also by a high-order standing wave of the resonant frequency. Position 3C to which support bars 21 and 121 are connected is preferably provided at a node of the high-order standing wave. The amplitude of the vibration at the node of the vibration is extremely small, hence preventing support bars 21 and 121 from suppressing the warping of arms 8 and 9.

Position 8C of arm 8 to which support bar 21 is connected is preferably closer to end 8A than to end 8B. Position 9C of arm 9 to which support bar 121 is connected is preferably closer to end 9A than to end 9B. Support bars 21 and 121, upon being connected to positions close to ends 8B and 9B that are the opened free ends, suppress the warping vibrations of arms 8 and 9, accordingly decreasing the amplitude of the vibration.

As described above, support bars 21 and 121 provided near arms 8 and 9 efficiently generate the repetitive rotational vibration of mirror 92 with large amplitude without attenuating the warping vibrations of arms 8 and 9.

Exemplary Embodiment 3

Figure 7:
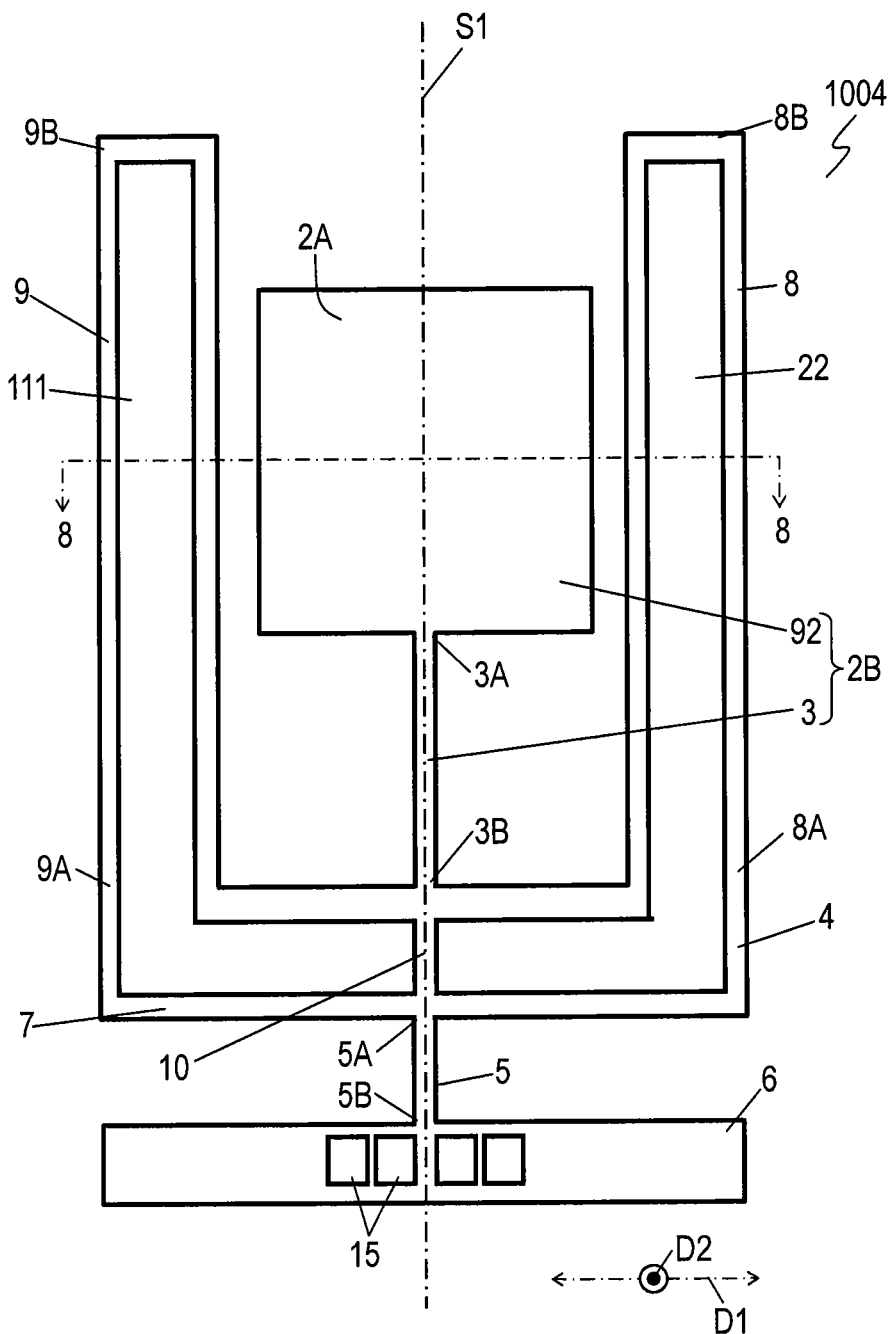
FIG. 7 is a plan view of an optical reflection device according to Exemplary Embodiment 3 of the invention.
Figure 8:
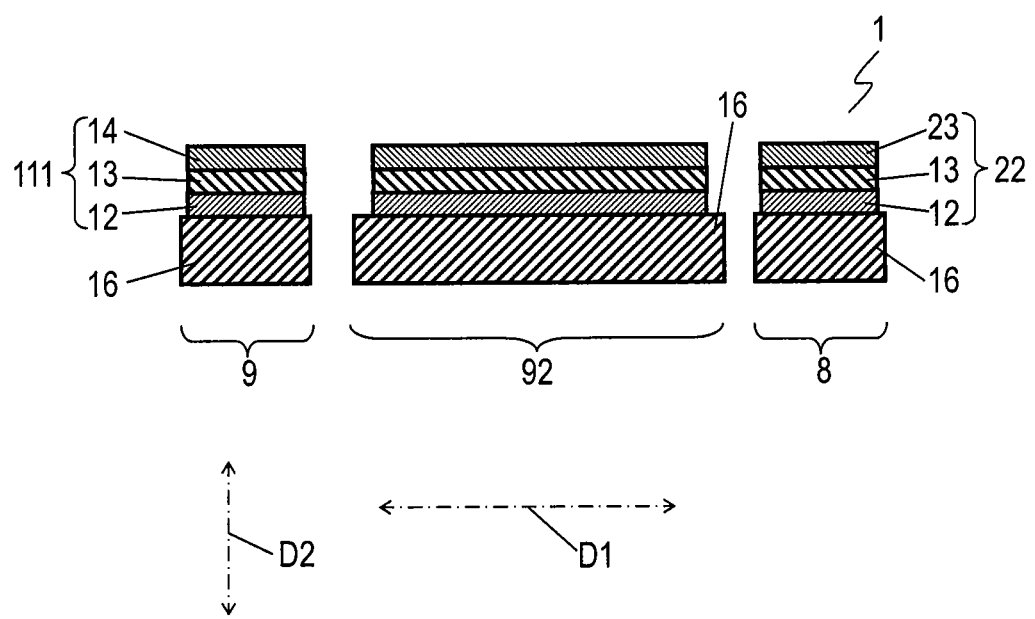
FIG. 8 is a sectional view of the optical reflection device on line 7-7 shown in FIG. 7.

FIG. 7 is a plan view of optical reflection device 1004 according to Exemplary Embodiment 3. FIG. 8 is a sectional view of optical reflection device 1004 shown in FIG. 7. In FIGS. 7 and 8, components identical to those of optical reflection device 1 shown in FIG. 1 are denoted by the same reference numerals, and their description will be omitted. Optical reflection device 1004 shown in FIG. 7 includes monitor element 22 provided on arm 8 instead of driver element 11 of optical reflection device 1 according to Embodiment 1 shown in FIG. 1.

Monitor element 22 includes lower electrode layer 12 provided on base material 16 constituting arm 8, piezoelectric layer 13 provided on lower electrode layer 12, and upper electrode layer 23 provided on piezoelectric layer 13. Base material 16, lower electrode layer 12, piezoelectric layer 13, and upper electrode layer 23 are arranged in direction D2 perpendicular to center axis S1 and direction D1. Lower electrode layer 12 and upper electrode layer 23 are made of conductive material. Piezoelectric layer 13 is made of piezoelectric material. Lower electrode layer 12 may be grounded. Lower electrode layer 12 and upper electrode layer 23 are connected to plural connection terminals 15 through lead lines.

Monitor element 22 may extend from arm 8 to joining portion 7. This structure enlarges the area of monitor element 22, and can efficiently detect the warping of arm 8, accordingly detecting the vibration of tuning fork vibrator 4 efficiently. Upper electrode layer 23 of monitor element 22 is electrically disconnected to upper electrode layer 14 of driver element 111. Lower electrode layer 12 and piezoelectric layer 13 of monitor element 22 may be connected to lower electrode layer 12 and piezoelectric layer 13 of driver element 111, respectively.

In optical reflection device 1004 according to Embodiment 3, when a signal having the resonant frequency of tuning fork vibrator 4 is applied to driver element 111 to generate the warping vibration of arm 9, the vibration propagates to arm 8 through joining portion 7, and generates the warping vibration of arm 8 in a reverse phase to arm 9 by resonance. That is, the warping vibration of arm 9 displaces arm 8 in a direction opposite to the displacement of arm 9 in direction D2. Monitor element 22 outputs the signal according to the vibration of arm 8, that is, the vibration of tuning fork vibrator 4. The driving signal is applied to driver element 111 according to the signal output from monitor element 93 through a feedback circuit. Therefore, the vibration of tuning fork vibrator 4 can be accurately controlled even if the resonant frequency of tuning fork vibrator 4 varies from an initial value due to a change of external environment factors, such as a temperature and a change of element 1004 itself with time.

One of driver element 111 and monitor element 22 may be provided on each of arms 8 and 9, so that wirings can be simplified to provide optical reflection device 1004 with excellent productivity.

Exemplary Embodiment 4

Figure 9:
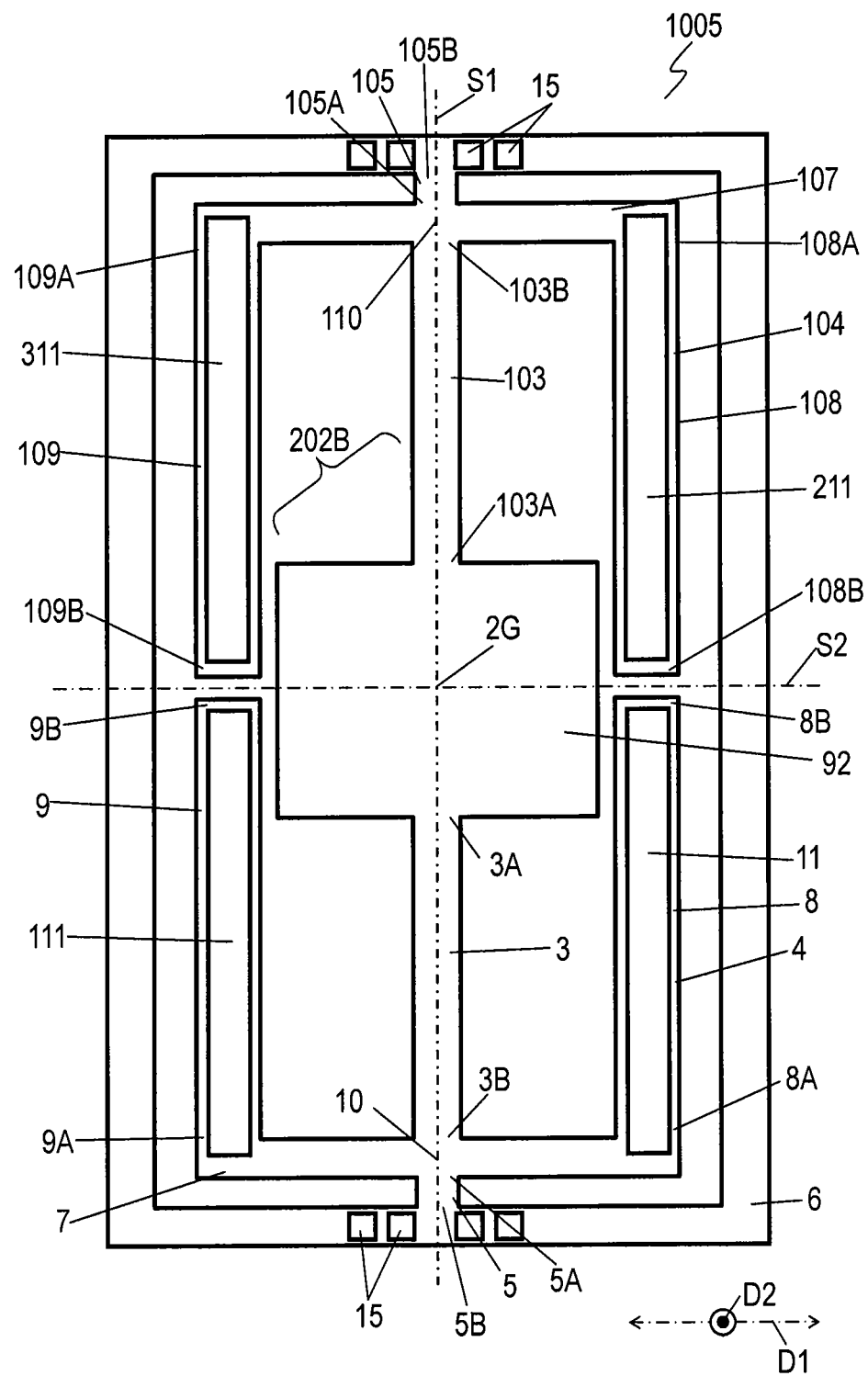
FIG. 9 is a plan view of an optical reflection device according to Exemplary Embodiment 4 of the invention.

FIG. 9 is a plan view of optical reflection device 1005 according to Exemplar Embodiment 4. In FIG. 9, components identical to those of optical reflection device 1 shown in FIG. 1 are denoted by the same reference numerals, and their description will be omitted. Optical reflection device 1005 further includes support beams 103 and 105 and tuning fork vibrator 104.

Support beam 103 has a linear shape extending on center axis S1, and has ends 103A and 103B located on center axis S1. End 103A is located on an opposite side to end 103B along center axis S1. That is, end 103A is located on the opposite side to end 103B in the direction of center axis S1. Support beam 105 has a linear shape extending on center axis S1, and has ends 105A and 105B located on center axis S1. End 105A is located on an opposite side to end 105B along center axis S1. That is, end 105A is located on the opposite side to end 105B in the direction of center axis S1. End 103A of support beam 103 is connected to mirror 92, and is located on a side opposite from end 3A of support beam 3 in the direction of center axis S1 about mirror 92 between the beams.

Tuning fork vibrator 104 has a tuning fork shape including joining portion 107 and arms 108 and 109. Joining portion 107 is located on center axis S1. Arms 108 and 109 extend substantially in parallel with center axis S1 toward mirror 92 from joining portion 107. Arms 108 and 109 have linear shapes having ends 108A and 109A and ends 108B and 109B, respectively. Ends 108A and 109A are connected to joining portion 107. Ends 108B and 109B are located on opposite sides to ends 108A and 109A in the direction of center axis S1. Nothing is connected to ends 108B and 109B, and ends 108B and 109B are free ends that are opened. Arms 108 and 109 are arranged in direction D1 perpendicular to center axis S1 while separated from center axis S1. Arms 108 and 109 are located symmetrically to each other about center axis S1. Mirror 92 is located between arms 108 and 109. Driver elements 211 and 311 are provided on arms 108 and 109, respectively. Driver elements 211 and 311 warp and vibrate arms 108 and 109, thereby vibrating tuning fork vibrator 104. Joining portion 107 of tuning fork vibrator 104 is connected to supporter 6 via support beam 105 between tuning fork vibrator 104 and supporter 6. Joining portion 107 is movable with respect to supporter 6. Supporter 6 has a frame shape surrounding mirror 92, support beams 3, 5, 103, and 105, and tuning fork vibrators 4 and 104.

Center axis S1 passes through point 2G that is a gravity center located substantially at the center of mirror 92. Tuning fork vibrators 4 and 104 are located symmetrically to each other about center axis S2 which passes through point 2G of mirror 92 perpendicularly to center axis 51.

Similarly to driver elements 11 and 111, driver elements 211 and 311 provided on arms 108 and 109 include lower electrode layer 12 provided on base material 16, piezoelectric layer 13 provided on lower electrode layer 12, and upper electrode layer 14 provided on piezoelectric layer 13.

An operation of optical reflection device 1005 according to Embodiment 4 will be described below.

An alternating-current (AC) voltages having resonant frequencies of tuning fork vibrators 4 and 104 are applied between lower electrode layers 12 and upper electrode layers 14 of each of driver elements 11, 111, 211, and 311 shown in FIG. 9. The AC voltages having the reverse polarities are applied to driver elements 11 and 111 provided on arms 8 and 9. The AC voltages having the reverse polarities are applied to driver elements 211 and 311 provided on arms 108 and 109. The AC voltages having the same polarity are applied to driver elements 11 and 211 provided on arms 8 and 108. The AC voltages having the same polarity are applied to driver elements 111 and 311 provided on arms 9 and 109.

Figure 10:
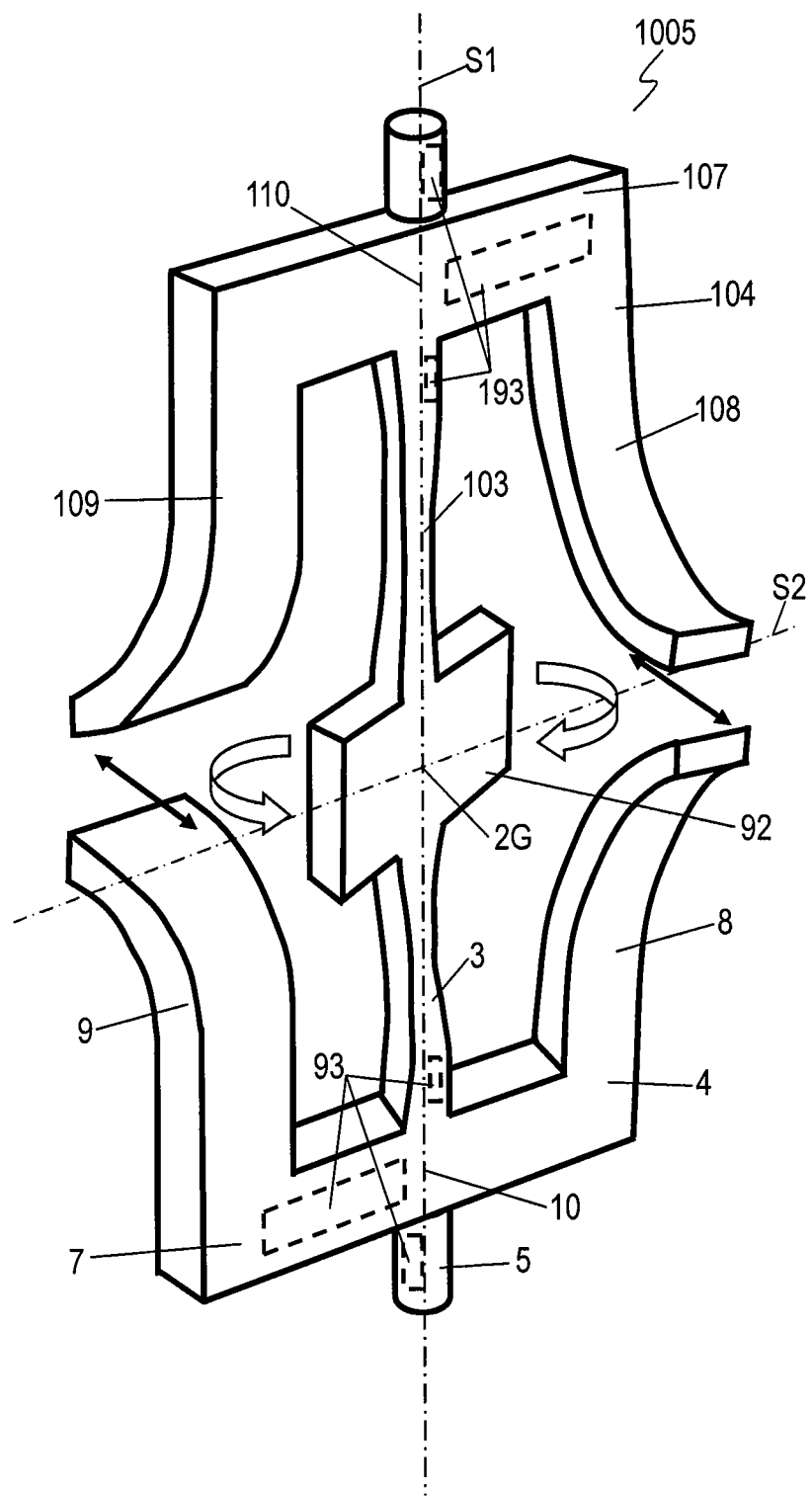
FIG. 10 is a perspective view of the optical reflection device according to Embodiment 4 for illustrating an operation of the optical reflection device.

FIG. 10 is a perspective view of optical reflection device 1005 operating. The warping vibrations of arms 8, 9, 108, and 109 are generated in direction D2 by applying the AC voltages to driver elements 11, 111, 211, and 311. Arms 8 and 108 warp in the same direction while arms 9 and 109 warp in the same direction. Arms 8 and 9 warp in directions opposite to each other, and arms 108 and 109 warp in directions opposite to each other.

The warping vibrations of arms 8 and 9 propagate to joining portion 7. Since joining portion 7 is connected to supporter 6 via support beam 5 between joining portion 7 and supporter 6, joining portion 7 is movable with respect to supporter 6. The vibrations propagating to joining portion 7 cause tuning fork vibrator 4, particularly joining portion 7 and support beam 5 to generate repetitive rotational vibration, that is, twisting vibration, about center axis S1 passing through vibration center 110 at a predetermined frequency. Similarly, the warping vibrations of arms 108 and 109 propagate to joining portion 107. Since joining portion 107 is connected to supporter 6 via support beam 105, joining portion 107 is movable with respect to supporter 6. The vibrations propagating to joining portion 107 cause tuning fork vibrator 104, particularly joining portion 107 and support beam 105 to generate a repetitive rotational vibration, that is, a twisting vibration about center axis 51 passing through vibration center 110 at a predetermined frequency.

The repetitive rotational vibrations of tuning fork vibrators 4 and 104 propagate to support beams 3 and 103, and case twisting vibrator 202B including support beams 3 and 103 and mirror 92 to generate a twisting vibration about center axis S1. Mirror 92 generates the repetitive rotational vibration about center axis S1. At this moment, a direction of the repetitive rotational vibrations of tuning fork vibrators 4 and 104 is opposite to a direction of the repetitive rotational vibration of twisting vibrator 202B including support beams 3 and 103 and mirror 92.

The resonant frequencies of tuning fork vibrators 4 and 104 are identical to the resonant frequency of twisting vibrator 202B. Therefore, tuning fork vibrators 4 and 104 have the high Q factors, hence providing optical reflection device 1005 that can vibrate mirror 92 without adverse effects of a disturbance vibration.

Tuning fork vibrators 4 and 104 are located symmetrically to each other about mirror 92 so as to allow mirror 92 to vibrate stably and symmetrically about center axis S1. This operation allows the light to be reflected from reflection surface 2A at point 2G which is the gravity center located substantially at the center of mirror 92, as a fixed point to perform stable scanning.

Support beams 3 and 103 support both ends of mirror 92 along center axis S1 and suppress unnecessary resonance of mirror 92, accordingly reducing the influence of the disturbance vibration.

As illustrated in FIG. 9, driver elements 211 and 311 may extend from arms 108 and 109 to joining portion 107. This structure enlarges areas of driver elements 211 and 311, and allows arms 108 and 109 to warp and vibrate largely to vibrate tuning fork vibrator 4 efficiently.

As illustrated in FIG. 10, optical reflection device 1005 may further include monitor element 93 that outputs a signal according to the vibration of tuning fork vibrator 4. Similarly to driver elements 11 and 111, monitor element 93 includes the lower electrode layer, the piezoelectric layer, and the upper electrode layer. The vibration of mirror 92 can be accurately controlled through the feedback circuit to accurately and stably drive optical reflection device 1005 by applying the driving signal to driver elements 11 and 111 according to the signal output from monitor element 93.

Monitor element 93 may be provided on joining portion 7 having a relatively wide area. Monitor element 93 is preferably disposed on joining portion 7 asymmetrically about vibration center 10. If monitor element 93 is disposed symmetrically about vibration center 10, the signal generated by monitor element 93 is canceled in monitor element 93, hence preventing the vibration of tuning fork vibrator 4 from being detected efficiently.

Monitor element 93 may be provided on support beam 3 or 5. In this case, monitor element 93 is disposed asymmetrically about center axis S1. If monitor elements 93 is disposed symmetrically about center axis S1, the signal generated by monitor elements 93 is canceled in monitor elements 93, hence preventing the vibration of tuning fork vibrator 4 from being detected efficiently.

In order to detect the vibration of mirror 92 with a small time delay, monitor element 93 is preferably provided on support beam 3 that is closer to mirror 92 than support beam 5 is. In order to shorten wirings from monitor element 93 as much as possible, monitor element 93 is preferably provided on support beam 5 that is closer to supporter 6 than to support beam 3.

As illustrated in FIG. 10, optical reflection device 1005 may further include monitor element 193 that outputs a signal according to the vibration of tuning fork vibrator 104. Similarly to driver elements 211 and 311, monitor element 193 includes the lower electrode layer, the piezoelectric layer, and the upper electrode layer. The vibration of mirror 92 can be accurately controlled through the feedback circuit to accurately and stably drive optical reflection device 1005 by applying the driving signal to driver elements 211 and 311 according to the signal output from monitor element 193.

Monitor element 193 may be provided on joining portion 107 having a relatively wide area. Monitor element 193 is preferably disposed on joining portion 107 asymmetrically about vibration center 110. If monitor element 193 is disposed symmetrically about vibration center 110, the signal generated by monitor elements 193 is canceled in monitor element 193, hence preventing the vibration of tuning fork vibrator 104 from being detected efficiently.

Monitor element 193 may be provided on support beam 103 or 105. In this case, monitor element 193 is preferably disposed asymmetrically about center axis S1. If monitor elements 193 is disposed symmetrically about center axis S1, the signal generated by monitor element 193 is canceled in monitor element 193, hence preventing the vibration of tuning fork vibrator 104 from being detected efficiently.

In order to detect the vibration of mirror 92 with a small time delay, monitor element 193 is preferably provided on support beam 103 that is closer to mirror 92 than support beam 105 is. In order to shorten wirings from monitor element 193 as much as possible, monitor element 193 is preferably provided on support beam 105 that is closer to supporter 6 than to support beam 103.

Figure 11A:
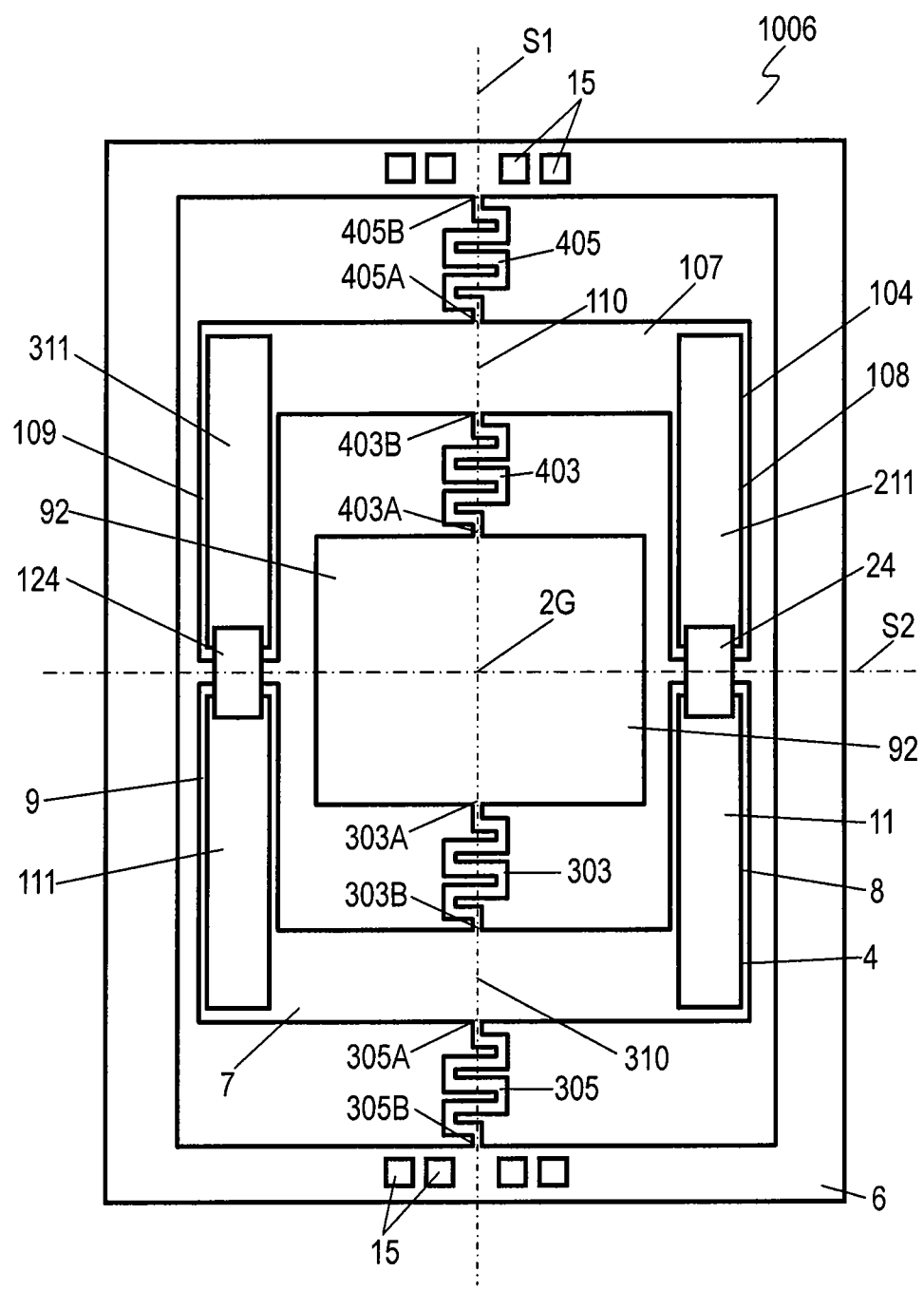
FIG. 11A is a plan view of another optical reflection device according to Embodiment 4.

FIG. 11A is a plan view of another optical reflection device 1006 according to Embodiment 4. In FIG. 11A, components identical to those of as optical reflection device 1005 shown in FIG. 9 are denoted by the same reference numerals, and their description will be omitted. Optical reflection device 1005 shown in FIG. 9 includes support beams 303, 305, 403, and 405 instead of support beams 3, 5, 103, and 105.

Support beam 303 has end 303A that is connected to mirror 92 and end 303B that is connected to joining portion 7 of tuning fork vibrator 4. Support beam 305 has end 305A that is connected to joining portion 7 of tuning fork vibrator 4 and end 305B that is connected to supporter 6. Support beams 303 and 305 have meander shapes extending from ends 303A and 305A to ends 303B and 305B and meandering along center axis 51, respectively. Ends 303A and 305A are located on opposite sides to ends 303B and 305B along center axis S1, respectively. That is, ends 303A and 305A are located on the opposite sides to ends 303B and 305B in the direction of center axis S1, respectively.

Support beam 403 has end 403A that is connected to mirror 92 and end 403B that is connected to joining portion 107 of tuning fork vibrator 104. Support beam 405 has end 405A that is connected to joining portion 107 of tuning fork vibrator 104 and end 405B that is connected to supporter 6. Support beams 403 and 405 have meander shapes extending from ends 403A and 405A to ends 403B and 405B while meandering along center axis S1, respectively. Ends 403A and 405A are located on opposite sides to ends 403B and 405B along center axis S1, respectively. That is, ends 403A and 405A are located on the opposite sides to ends 403B and 405B in the direction of center axis S1, respectively.

Support beams 303, 305, 403, and 405 have the meander shapes, and have the resonant frequencies lower than those of support beams 3, 5, 103, and 105 having the linear shapes shown in FIG. 9, hence turning and vibrating mirror 92 with large amplitude.

Gravity centers of support beams 303, 305, 403, and 405 are preferably located on center axis S1. This arrangement suppresses unnecessary vibration of mirror 92, and generates the repetitive rotational vibration of mirror 92 stably while point 2G that is the gravity center of mirror 92 does not move, hence allowing optical reflection device 1006 to accurately perform the scanning operation with the light. Support beams 303 and 305 are fixed to vibration center 10 of tuning fork vibrator 4 located at joining portion 7. Support beams 403 and 405 are fixed to vibration center 110 of tuning fork vibrator 104 located in joining portion 107. Support beams 303, 305, 403, and 405 have the same resonant frequency, hence twisting and vibrating efficiently.

Optical reflection device 1006 shown in FIG. 11A includes support beams 303, 305, 403, and 405 having the meander shapes. Optical reflection device 1006 according to Embodiment 4 may include support beams 3 and 103 having the linear shapes shown in FIG. 9 instead of support beams 303 and 403. In this case, tuning fork vibrators 4 and 104 can vibrate symmetrically about center axis S2 perpendicular to center axis S1 passing through point 2G of mirror 92, hence generating the repetitive rotational vibration of mirror 92 stably while point 2G of mirror 92 does not move. Optical reflection device 1006 according to Embodiment 4 may include support beams 5 and 105 having the linear shapes shown in FIG. 9 instead of support beams 305 and 405. In this case, tuning fork vibrators 4 and 104 can vibrate symmetrically about center axis S2 perpendicular to center axis S1 passing through point 2G of mirror 92, hence generating the repetitive rotational vibration of mirror 92 stably while point 2G of mirror 92 does not move.

Optical reflection device 1006 according to Embodiment 4 may include elastic member 24 that connects between ends 8B and 108B of arms 8 and 108 facing each other, and elastic member 124 that connects between ends 9B and 109B of arms 9 and 109 facing each other. Elastic members 24 and 124 can eliminate the difference in resonant frequency even if the resonant frequencies of tuning fork vibrators 4 and 104 are slightly different from each other due to a production variation. This structure enhances the symmetry of tuning fork vibrators 4 and 104, and allows tuning fork vibrators 4 and 104 to vibrate so that arms 8 and 108 are displaced in the same direction while arms 9 and 109 are displaced in the same direction, thereby allowing mirror 92 to turn and vibrate with large amplitude. The enhancement of the symmetry can increase the Q factors of tuning fork vibrators 4 and 104 to reduce the unnecessary resonance.

Elastic members 24 and 124 are preferably made of soft material having an elastic modulus smaller than that of base material 16 of optical reflection device 1006. In particular, elastic members 24 and 124 are preferably made of material having a large stretching property along center axis S1. One of metal, rubber, and elastomer is used as the material of elastic members 24 and 124 in view of insulating property and availability.

Elastic members 24 and 124 have an elastic modulus lower than that of arms 8, 9, 108, and 109 so as to suppress attenuation of the vibration of tuning fork vibrators 4 and 104.

Elastic members 24 and 124 have sheet shapes, whereby tuning fork vibrators 4 and 104 can be joined securely while the unnecessary vibration is suppressed in tuning fork vibrators 4 and 104. Elastic member 24 and 124 control the vibration modes of tuning fork vibrators 4 and 104, and have the resonant frequencies of tuning fork vibrators 4 and 104 match with each other, hence providing tuning fork vibrators 4 and 104 with high Q factors. Optical reflection device 1006 has a small size and can control the twisting angle of mirror 92 accurately.

In optical reflection devices 1005 and 1006 shown in FIGS. 9 and 10, similarly to projections 20 and 120 shown in FIG. 5, projections may be provided at ends 8B, 9B, 108B, and 109B of arms 8, 9, 108, and 109. The mass of projections lowers the frequencies of the vibrations of tuning fork vibrators 4 and 104 due to the mass of the projections, and increases the amplitudes of the vibrations.

Figure 11B:
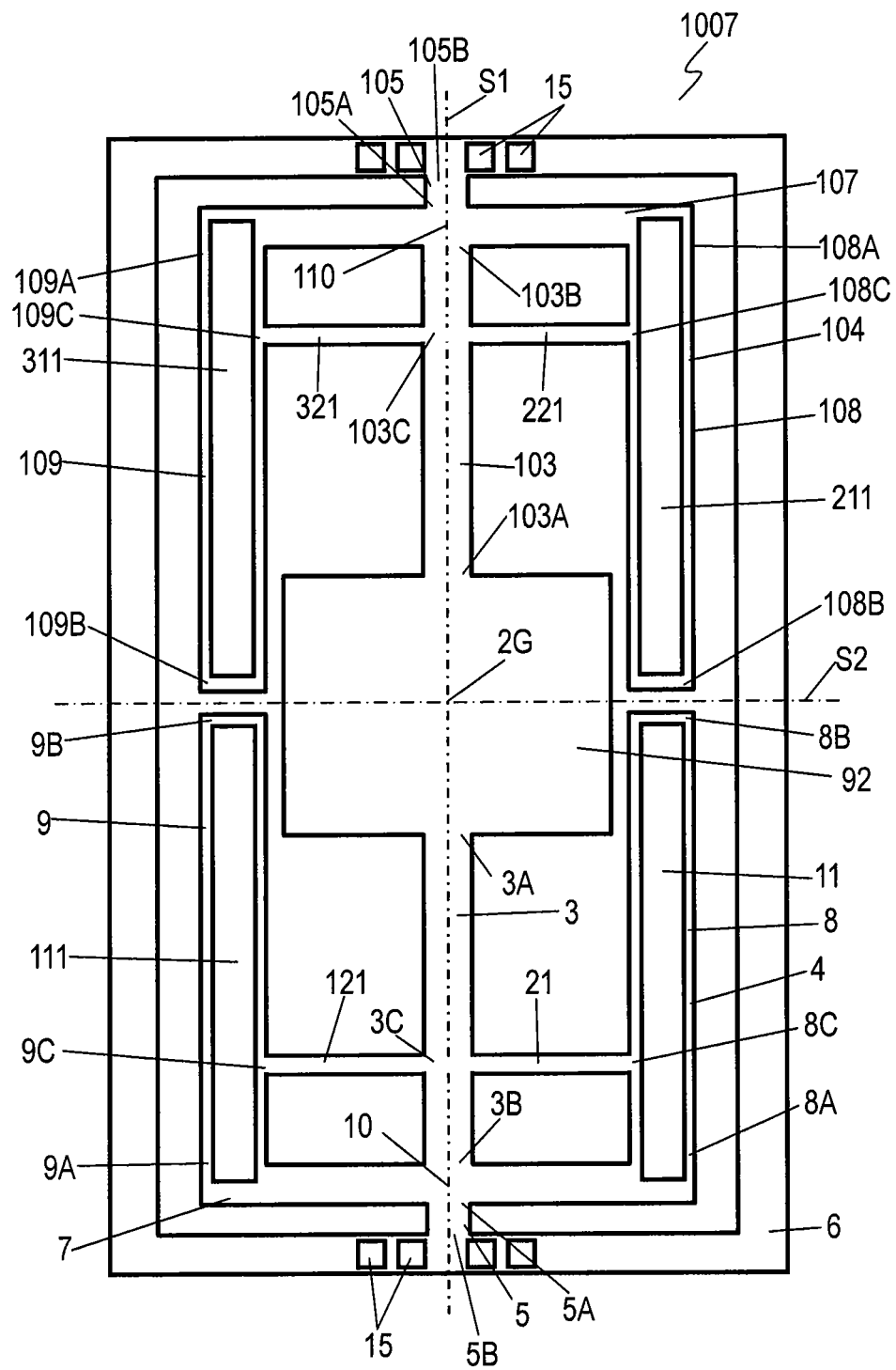
FIG. 11B is a plan view of still another optical reflection device according to Embodiment 4.

FIG. 11B is a plan view of still another optical reflection device 1007 according to Embodiment 4. In FIG. 11B, components identical to those of optical reflection device 1005 shown in FIG. 9 are denoted by the same reference numerals, and their description will be omitted. Optical reflection device 1007 shown in FIG. 11B further includes support bar 21 extending from support beam 3 to arm 8, support bar 121 extending from support beam 3 to arm 9, support bar 221 extending from support beam 103 to arm 108, and support bar 321 extending from support beam 103 to arm 109. Support bar 21 extends perpendicularly to center axis S1 from position 3C between ends 3A and 3B of support beam 3 to position 8C between ends 8A and 8B of arm 8. Support bar 121 extends perpendicularly to center axis S1 from position 3C between ends 3A and 3B of support beam 3 to position 9C between ends 9A and 9B of arm 9. Support bar 221 extends perpendicularly to center axis S1 from position 103C between ends 103A and 103B of support beam 103 to position 108C between ends 108A and 108B of arm 108. Support bar 321 extends perpendicularly to center axis 51 from position 103C between ends 103A and 103B of support beam 103 to position 109C between ends 109A and 109B of arm 109. Support bars 21, 121, 221, and 321 have linear shapes. The vibrations of arms 8 and 9 propagate to support beam 3 through not only joining portion 7 but also support bars 21 and 121. This structure allows energy of the repetitive rotational vibration of tuning fork vibrator 4 to transmit to support beam 3 through joining portion 7 and support bars 21 and 121. The vibrations of arms 108 and 109 propagate to support beam 103 through not only joining portion 107 but also support bars 221 and 321. This structure allows energy of the repetitive rotational vibration of tuning fork vibrator 104 to transmit to support beam 103 through joining portion 107 and support bars 221 and 321, thereby allowing mirror 92 to repetitively rotating efficiently.

Twisting vibrator 202B including support beams 3 and 103 and mirror 92 is also vibrated by a high-order standing wave of the resonant frequency. Positions 3C and 103C to which support bars 21, 121, 221, and 321 are connected are preferably provided at the nodes of the high-order standing wave. The warping of arms 8, 9, 108, and 109 is hardly suppressed due to extremely small amplitude at the node of the vibration.

Position 8C of arm 8 to which support bar 21 is connected is closer to end 8A than to end 8B. Position 9C of arm 9 to which support bar 121 is connected is closer to end 9A than to end 9B. If support bars 21 and 121 are connected to positions near ends 8B and 9B that are the opened free ends, the warping vibrations of arms 8 and 9 are suppressed, and therefore the vibration amplitude is decreased. Position 108C of arm 108 to which support bar 221 is connected is closer to end 108A than to end 108B. Position 109C of arm 109 to which support bar 321 is connected is closer to end 109A than to end 109B. If support bars 221 and 321 are connected to positions near ends 108B and 109B that are the opened free ends, the warping vibrations of arms 108 and 109 are suppressed, and therefore the vibration amplitude is decreased.

Exemplary Embodiment 5

Figure 12:
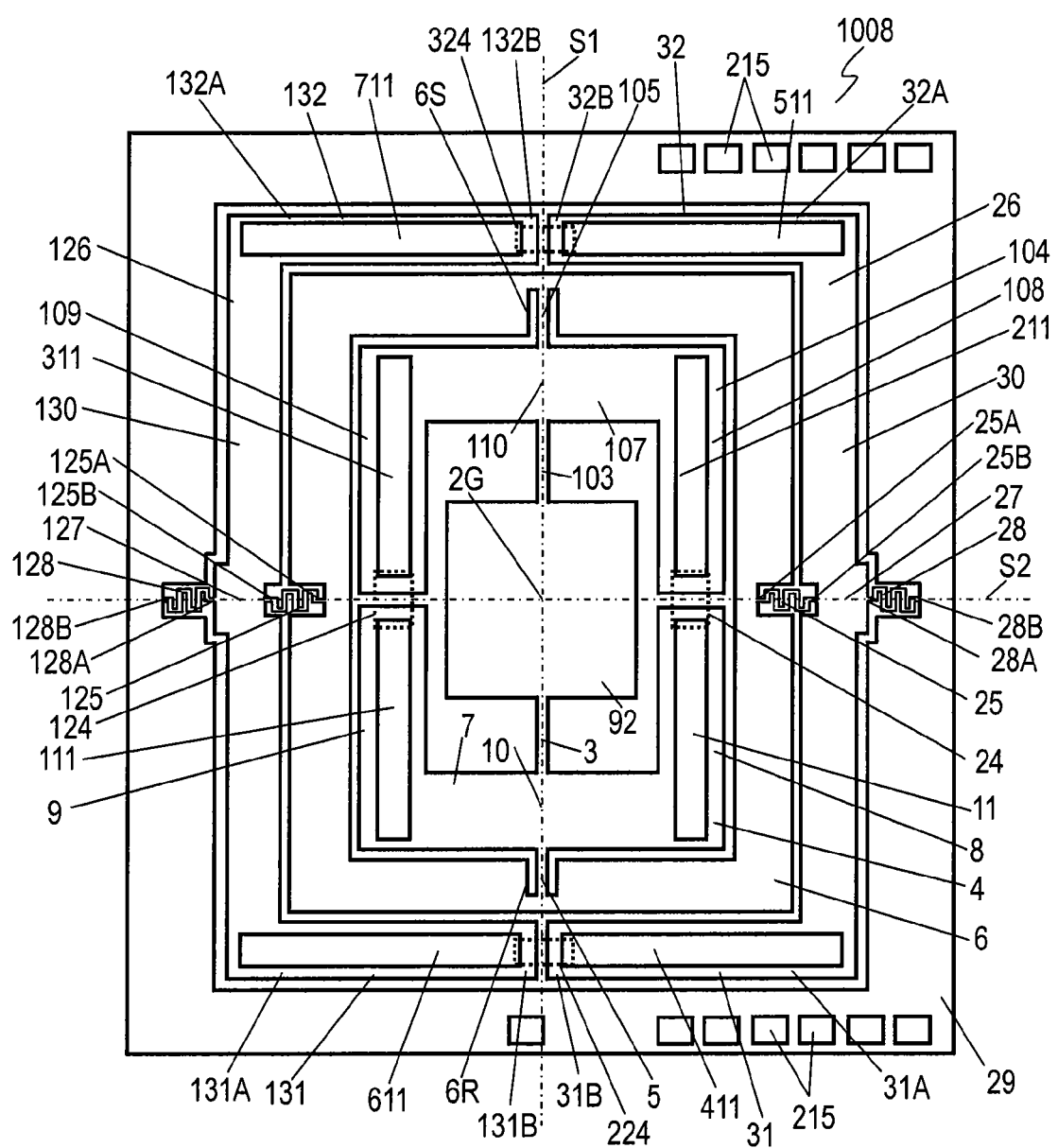
FIG. 12 is a plan view of an optical reflection device according to Exemplary Embodiment 5 of the invention.

FIG. 12 is a plan view of optical reflection device 1008 according to Exemplary Embodiment 5. In FIG. 12, components identical to those of optical reflection device 1005 shown in FIG. 9 are denoted by the same reference numerals, and their description will be omitted. Optical reflection device 1008 according to Embodiment 5 further includes support beam 25 that has end 25A connected to supporter 6, tuning fork vibrator 26 that is connected to end 25B of support beam 25, support beam 28 that has end 28A connected to tuning fork vibrator 26, supporter 29 that is connected to end 28B of support beam 28, support beam 125 that has end 125A connected to supporter 6, tuning fork vibrator 126 that is connected to end 125B of support beam 125, and support beam 128 that has end 128A connected to tuning fork vibrator 126. Support beam 128 has end 128B that is connected to supporter 29. Support beams 25, 28, 125, and 128 have meander shapes extending from ends 25A, 28A, 125A, and 128A to ends 25B, 28B, 125B, and 128B while meandering along center axis S2, respectively. Ends 25A, 25B, 28A, 28B, 125A, 125B, 128A, and 128B are located on center axis S2. Ends 25A, 28A, 125A, and 128A are located on opposite sides to ends 25B, 28B, 125B, and 128B along center axis S2, respectively. That is, ends 25A, 28A, 125A, and 128A are located on the opposite sides to ends 25B, 28B, 125B, and 128B in a direction of center axis S2, respectively.

Tuning fork vibrator 26 has a tuning fork shape including joining portion 30 and arms 31 and 32. Joining portion 30 is located on center axis S2. Arms 31 and 32 extend substantially in parallel with center axis S2 from joining portion 30. Arms 31 and 32 have linear shapes having ends 31A and 32A and ends 31B and 32B, respectively. Ends 31A and 32A are connected to joining portion 30. Ends 31B and 32B are located on opposite sides to ends 31A and 32A in the direction of center axis S2. Nothing is connected to ends 31B and 32B, and ends 31B and 32B are free ends that are opened. Arms 31 and 32 are arranged in a direction perpendicular to center axis S2 while separated from center axis S2. Arms 31 and 32 are located symmetrically to each other about center axis S2. Supporter 6 is located between arms 31 and 32. Driver elements 411 and 511 are provided on arms 31 and 32, respectively. Driver elements 411 and 511 warp and vibrate arms 31 and 32, thereby vibrating tuning fork vibrator 26. Joining portion 30 of tuning fork vibrator 26 is connected to supporter 29 via support beam 28, and is movable with respect to supporter 29.

Support beams 25 and 28 are fixed to vibration center 27 of tuning fork vibrator 26 located at joining portion 30. Support beams 25 and 28 have the same resonant frequency to allow support beams 25 and 28 to be twisted and vibrated efficiently.

Tuning fork vibrator 126 has a tuning fork shape including joining portion 130 and arms 131 and 132. Joining portion 130 is located on center axis S2. Arms 131 and 132 extend substantially in parallel with center axis S2 from joining portion 130. Arms 131 and 132 have linear shapes having ends 131A and 132A and ends 131B and 132B, respectively. Ends 131A and 132A are connected to joining portion 130. End 131B and 132B are located on opposite sides to ends 131A and 132A in the direction of center axis S1. Nothing is connected to ends 131B and 132B, and ends 131B and 132B are free ends that are opened. Arms 131 and 132 are arranged in direction perpendicular to center axis S2 while separated from center axis S2. Arms 131 and 132 are located symmetrically to each other about center axis S2. Supporter 6 is located between arms 131 and 132. Driver elements 611 and 711 are provided on arms 131 and 132, respectively. Driver elements 611 and 711 warp and vibrate arms 131 and 132, thereby vibrating tuning fork vibrator 126. Joining portion 130 of tuning fork vibrator 126 is connected to supporter 29 via support beam 128, and is movable with respect to supporter 29. Driver elements 411, 511, 611, and 711 are made of the same material as driver elements 11 and 111 shown in FIG. 2 and have the same structure as driver elements 11 and 111 shown in FIG. 2. That is, each of driver elements 411, 511, 611, and 711 includes lower electrode layer 12 that is provided on base material 16 constituting arm 31 (32, 131, and 132), piezoelectric layer 13 that is provided on lower electrode layer 12, and upper electrode layer 14 that is provided on piezoelectric layer 13.

Support beams 125 and 128 are fixed to vibration center 127 of tuning fork vibrator 126 located at joining portion 130. Since support beams 125 and 128 have the same resonant frequency, support beams 125 and 128 are twisted and vibrated efficiently.

Supporter 6 has a frame shape surrounding tuning fork vibrators 4 and 104, support beams 3, 5, 103, and 105, and mirror 92. Supporter 29 has a frame shape surrounding supporter 6, tuning fork vibrators 26 and 126, and support beams 25, 28, 125, and 128.

Center axes S1 and S2 that are perpendicular to each other intersect at point 2G that is the gravity center located substantially in the center of mirror 92. Tuning fork vibrators 26 and 126 have shapes that are symmetrical to each other about center axis S2. Tuning fork vibrators 26 and 126 have shapes that are symmetrical to each other about center axis S1.

Figure 13A:
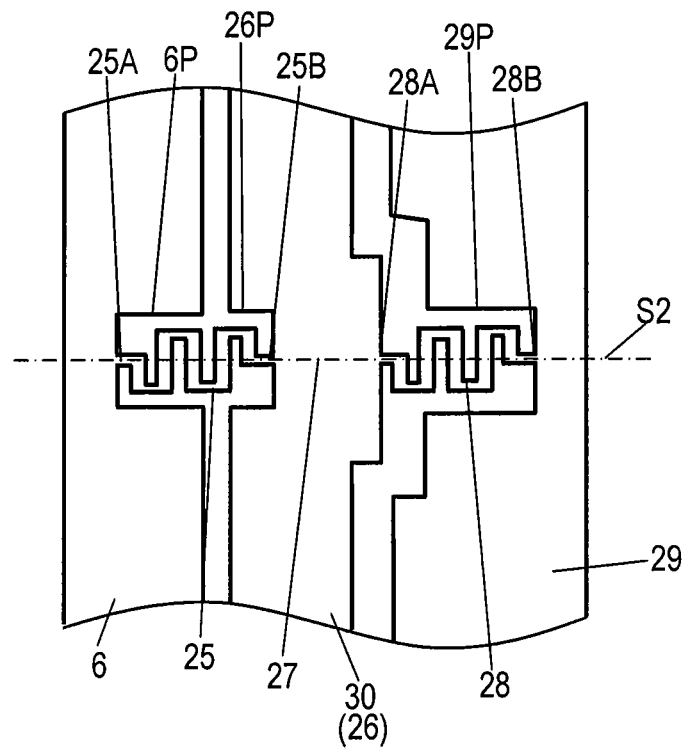
FIG. 13A is an enlarged plan view of the optical reflection device shown in FIG. 12.
Figure 13B:
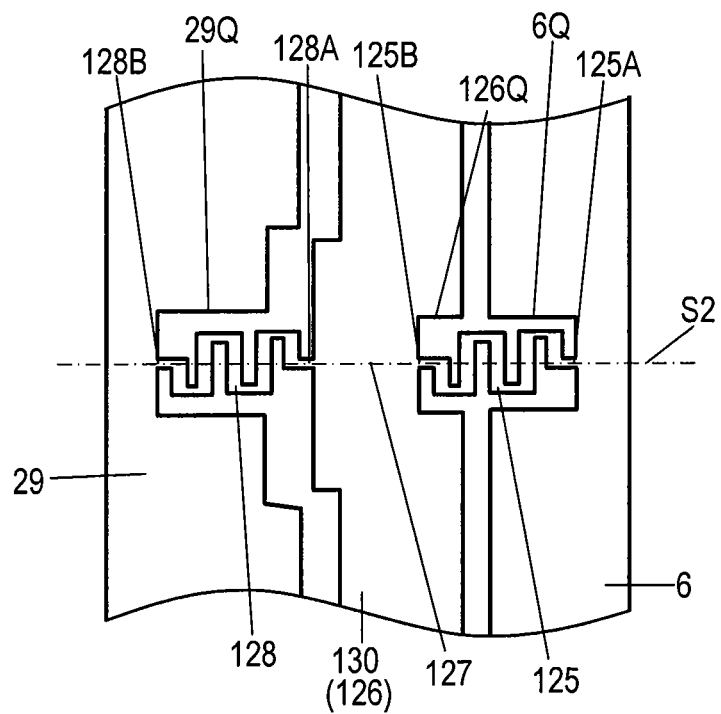
FIG. 13B is an enlarged plan view of the optical reflection device shown in FIG. 12.

FIG. 13A is an enlarged plan view of optical reflection device 1008 for illustrating support beams 25 and 28. FIG. 13B is an enlarged plan view of optical reflection device 1008 for illustrating support beams 125 and 128. Support beams 25 and 125 are symmetrical to each other about point 2G at which center axes S1 and S2 intersect each other. That is, support beam 25, upon rotating by 180 degrees about point 2G, overlaps support beam 125. Similarly, support beams 28 and 128 are symmetrical to each other about point 2G at which center axes S1 and S2 intersect. That is, support beam 28, upon rotating by 180 degrees about point 2G, overlaps support beam 128. Support beams 25 and 125 are symmetrical to each other about point 2G. Support beams 28 and 128 are symmetrical to each other about point 2G to balance device 1008 in weight to reduce the generation of the unnecessary vibration.

Ends 25A, 25B, 28A, 28B, 125A, 125B, 128A, and 128B of support beams 25, 28, 125, and 128 are located on center axis S2 to suppress the unnecessary vibration.

Support beams 25, 28, 125, and 128 have the same length and the same resonant frequency, so that tuning fork vibrators 26 and 126 can efficiently be driven. The gravity centers of support beams 25, 28, 125, and 128 are located on center axis S2 to reduce the unnecessary vibration.

The resonant frequency of tuning fork vibrator 26 is substantially equal to the resonant frequency of the twisting vibrator that includes mirror 92, tuning fork vibrators 4 and 104, supporter 6, and support beams 3, 25, and 103. Similarly, the resonant frequency of tuning fork vibrator 126 is substantially equal to the resonant frequency of the twisting vibrator that includes mirror 92, tuning fork vibrators 4 and 104, supporter 6, and support beams 3, 125, and 103.

As illustrated in FIG. 13A, end 25A of support beam 25 is connected to recess 6P that is provided in supporter 6 along center axis S2, and end 25B is connected to recess 26P that is provided in joining portion 30 of tuning fork vibrator 26 along center axis S2. Similarly, as illustrated in FIG. 13B, end 125A of support beam 125 is connected to recess 6Q that is provided in supporter 6 along center axis S2, and end 125B is connected to recess 126Q that is provided in joining portion 130 of tuning fork vibrator 126 along center axis S2. This structure can locate support beams 25 and 125 in a small space to reduce the size of optical reflection device 1008 even if lengths of support beams 25 and 125 are large. Recesses 6P and 6Q of supporter 6 has depths equal to each other in the direction of center axis S2. Recesses 25P and 126Q of tuning fork vibrators 26 and 126 have depths equal to each other in the direction of center axis S2.

The depths of spaces of tuning fork vibrators 26 and 126 accommodating therein support beams 25 and 125 in the direction of center axis S2 are larger than the depths of recesses 6P and 6Q of supporter 6 in the direction of center axis S2. If the depths of recesses 26P and 126Q of tuning fork vibrators 26 and 126 are large, shapes of portions near vibration center 27 and 127 of tuning fork vibrators 26 and 126 become complicated, and occasionally the unnecessary vibration mode is generated in tuning fork vibrators 26 and 126. Particularly, in optical reflection device 1008 according to Embodiment 5, since support beams 25 and 125 have the meander shapes, the widths of recesses 26P and 126Q of tuning fork vibrators 26 and 126 in the direction perpendicular to center axis S2 increase. If the depths of recesses 26P and 126Q increases, the areas of recesses 26P and 126Q are enlarged to increase the unnecessary vibration modes of tuning fork vibrators 26 and 126.

As illustrated in FIG. 13A, end 28B of support beam 28 is connected to recess 29P that is provided in supporter 29 along center axis S2. Similarly, as illustrated in FIG. 13B, end 128B of support beam 128 is connected to recess 29Q that is provided in supporter 29 along center axis S2. In order to efficiently generate the twisting vibrations of supporter 6 and support beams 25 and 125, the lengths of support beams 25 and 25 are equal to the lengths of support beams 28 and 28. Even if support beams 28 and 128 are long, support beams 28 and 128 can be accommodated into recesses 29P and 29Q of supporter 29, thus providing optical reflection device 1008 with a small size.

In optical reflection device 1008 according to Embodiment 5, as illustrated in FIG. 12, end 5B of support beam 5 is connected to recess 6R that is provided in supporter 6 along center axis S1, and end 105B is connected to recess 6S that is provided in supporter 6 along center axis S1. In recesses 6R and 6S, although the width of supporter 6 is locally narrowed, the widths of joining portions 7 and 107 of tuning fork vibrators 4 and 104 are constant. A stress is concentrated on a region having a width locally narrowed in a vibrating object, and may generate an unnecessary vibration mode. In optical reflection device 1008 according to Embodiment 5, the widths of arms 8 and 9 and joining portion 7 are constant in tuning fork vibrator 4, and the widths of arms 108 and 109 and joining portion 107 are constant in tuning fork vibrator 104, so that the stress can evenly be dispersed in tuning fork vibrators 4 and 104 to stably vibrate tuning fork vibrators 4 and 104.

The widths of arms 31, 32, 131, and 132 of tuning fork vibrators 26 and 126 are equal to the widths of joining portions 30 and 130 to reduce the unnecessary vibration mode generated in optical reflection device 1008.

Optical reflection device 1008 according to Embodiment 5 may not include one of driver elements 411 and 511 provided on arms 31 and 32. Optical reflection device 1008 may not necessarily include one of driver elements 611 and 711 provided in arms 131 and 132.

Upper electrode layer 14 and lower electrode layer 12 of driver elements 11, 111, 211, 311, 411, 511, 611, and 711 are connected to plural connection terminals 215 provided on supporter 29 via plural lead lines. Alternating-current (AC) voltages having reverse polarities can be applied to driver elements 11 and 111 via plural connection terminals 215. AC voltages having reverse polarities can be applied to driver elements 211 and 311 via plural connection terminals 215. AC voltages having reverse polarities can be applied to driver elements 411 and 511 via plural connection terminals 215.

AC voltages having reverse polarities can be applied to driver elements 611 and 711 via plural connection terminals 215.

In optical reflection device 1008 according to Embodiment 5, one of driver elements 11 and 111 may function as the monitor element that detects the vibration of tuning fork vibrator 4 and outputs the signal according to the vibration. Similarly, one of driver elements 211 and 311 may function as the monitor element that detects the vibration of tuning fork vibrator 104 and outputs the signal according to the vibration. Similarly, one of driver elements 411 and 511 may function as the monitor element that detects the vibration of tuning fork vibrator 26 and outputs the signal according to the vibration. Similarly, one of driver elements 611 and 711 may function as the monitor element that detects the vibration of tuning fork vibrator 126 and outputs the signal according to the vibration. Upper electrode layer 14 and lower electrode layer 12 of monitor element are connected to connection terminal 215 through plural lead lines. A driving signal is applied to the driver element according to the signal output from the monitor element through a feedback circuit. This operation controls the vibration of mirror 92 accurately to accurately and stably drive optical reflection device 1008.

Similarly to optical reflection device 1 according to Embodiment 1, optical reflection device 1008 according to Embodiment 5 can be produced from base material 16, and plural optical reflection devices 1008 can be produced accurately at once.

An operation of optical reflection device 1008 according to Embodiment 5 will be described below.

Similarly to optical reflection device 1005 according to Embodiment 5 illustrated in FIGS. 9 and 10, the AC voltages having the resonant frequencies of tuning fork vibrators 4 and 104 are applied between lower electrode layers 12 and upper electrode layers 14 of driver elements 11, 111, 211, and 311. The AC voltages having the reverse polarities are applied to driver elements 11 and 111 provided on arms 8 and 9, respectively. The AC voltages having the reverse polarities are applied to driver elements 211 and 311 provided on arms 108 and 109, respectively. The AC voltages having the same polarity are applied to driver elements 11 and 211 provided on arms 8 and 108, respectively. The AC voltages having the same polarity are applied to driver elements 111 and 311 provided on arms 9 and 109, respectively. The warping vibrations of arms 8, 9, 108, and 109 are generated by applying the AC voltages to driver elements 11, 111, 211, and 311. Arms 8 and 108 warp in the same direction, and arms 9 and 109 warp in the same direction. Arms 8 and 9 warp in the directions opposite to each other, and arms 108 and 109 warp in the directions opposite to each other.

The warping vibration of arms 8 and 9 propagates to joining portion 7. Joining portion 7 is connected to supporter 6 via support beam 5, and is movable with respect to supporter 6. Accordingly, tuning fork vibrator 4 and support beam 5 generate the repetitive rotational vibration, that is, the twisting vibration about center axis S1 passing through vibration center 110 at a predetermined frequency by the vibration propagating to joining portion 7. Similarly the warping vibration of arms 108 and 109 propagates to joining portion 107. Joining portion 107 is connected to supporter 6 via support beam 105, and is movable with respect to supporter 6. Accordingly, tuning fork vibrator 104 and support beam 105 generate the repetitive rotational vibration, that is, the twisting vibration about center axis S1 passing through vibration center 110 at a predetermined frequency by the vibration propagating to joining portion 107.

The repetitive rotational vibration of tuning fork vibrators 4 and 104 propagates to support beams 3 and 103, and twisting vibrator 202B including support beams 3 and 103 and mirror 92 generates the twisting vibration about center axis S1. Mirror 92 generates the repetitive rotational vibration about center axis S1. At this moment, the direction of the repetitive rotational vibration of tuning fork vibrators 4 and 104 is opposite to the direction of the repetitive rotational vibration of twisting vibrator including support beams 3 and 103 and mirror 92.

Similarly to tuning fork vibrators 4 and 104, the AC voltages having the resonant frequencies of tuning fork vibrators 26 and 126 are applied between lower electrode layers 12 and upper electrode layers 14 of driver elements 411, 511, 611, and 711. The AC voltages having the reverse polarities are applied to driver elements 411 and 511 provided on arms 31 and 32, respectively. The AC voltages having the reverse polarities are applied to driver elements 611 and 711 provided on arms 131 and 132, respectively. The AC voltages having the same polarity are applied to driver elements 411 and 611 provided on arms 31 and 131, respectively. The AC voltages having the same polarity are applied to driver elements 511 and 711 provided on arms 31 and 131, respectively. The warping vibration of arms 31, 32, 131, and 132 is generated by applying the AC voltages to driver elements 411, 511, 611, and 711. Arms 31 and 131 warp in the same direction, and arms 32 and 132 warp in the same direction. Arms 31 and 32 warp in the directions opposite to each other, and arms 131 and 132 warp in the directions opposite to each other. The warping vibration of arms 31, 32, 131, and 132 is generated by applying the AC voltages to driver elements 411, 511, 611, and 711. Arms 31 and 131 warp in the same direction, and arms 32 and 132 warp in the same direction. Arms 31 and 32 warp in the directions opposite to each other, and arms 131 and 132 warp in the directions opposite to each other.

The warping vibration of arms 31 and 32 propagates to joining portion 30. Joining portion 30 is connected to supporter 29 via support beam 28, and is movable with respect to supporter 29. Accordingly, tuning fork vibrator 26 and support beam 28 generate the repetitive rotational vibration, that is, the twisting vibration about center axis S2 passing through vibration center 27 at a predetermined frequency by the vibration propagating to joining portion 30. Similarly, the warping vibration of arms 131 and 132 propagates to joining portion 130. Joining portion 130 is connected to supporter 29 via support beam 128, and is movable with respect to supporter 29. Accordingly, tuning fork vibrator 126, in particular, joining portion 130 and support beam 128 generate the repetitive rotational vibration, that is, the twisting vibration about center axis S2 passing through vibration center 127 at a predetermined frequency by the vibration propagating to joining portion 130.

The repetitive rotational vibration of tuning fork vibrators 26 and 126 propagates to support beams 25 and 125. A twisting vibrator including support beams 25 and 125 and supporter 6 generates the twisting vibration about center axis S2. Supporter 6 generates the repetitive rotational vibration about center axis S2, and mirror 92 generates the repetitive rotational vibration about center axis S2. At this moment, the direction of the repetitive rotational vibrations of tuning fork vibrators 26 and 126 is opposite to the direction of the repetitive rotational vibration of twisting vibrator including support beams 25 and 125 and supporter 6.

Laser beam enters from a light source onto mirror 92 that generates the repetitive rotational vibration about center axes S1 and S2. The laser beam is reflected on reflection surface 2A of mirror 92 of optical reflection device 1008, and irradiates a screen to scan the screen. Since center axes S1 and S2 are perpendicular to each other, optical reflection device 1008 can scan the screen in a two-axis direction, that is, an XY-plane with the light output from mirror 92. Thus, mirror 92 generates the repetitive rotational vibration about the two axes by tuning fork vibrators 4, 104, 26, and 126, providing optical reflection device 1008 with a small size.

In optical reflection device 1008 according to Embodiment 5, since support beams 25 and 125 have the meander shapes, support beams 25 and 125 have small spring constants. Accordingly, supporter 6 connected to support beams 25 and 125 generates repetitive rotational vibration of supporter 6 with large amplitude. Although center axis S2 is perpendicular to center axis S1, center axis S2 is not correctly perpendicular to center axis S1 due to a production error and a measurement error. However, the similar effect is obtained as long as center axis S2 is substantially perpendicular to center axis S1.

Support beams 28 and 128 that generate the repetitive rotational vibration in the opposite direction to support beams 25 and 125 also have the meander shapes, so that the beam lengths of support beams 25, 28, 125, and 128 can be equal to each other to efficiently vibrate supporter 6.

In optical reflection device 1008 according to Embodiment 5, since support beams 25, 28, 125, and 128 have the meander shapes, support beams 25, 28, 125, and 128 have spring constants smaller than those of support beams 3, 5, 103, and 105 having the linear shapes. This allows supporter 6, i.e., mirror 92 to generate the repetitive rotational vibration about center axis S2 at a low frequency. Center axis S2 is aligned with the horizontal direction, and mirror 92 vibrates in a Y-axis direction of the vertical direction of the screen by twisting vibrators 26 and 126, hence lowering a frequency fV of the scanning in the Y-axis direction with the light projected onto the screen. Scanning in an X-axis direction perpendicular to the Y-axis with the light can be performed by vibrating mirror 92 about center axis S1. This arrangement increases a ratio fH/fV of a frequency fH of the scanning in the X-axis direction on the screen to the frequency fV of the scanning in the Y-axis direction in optical reflection device 1008.

If the ratio fH/fV is large, a scanning speed in the X-axis direction can increase in relative to a scanning speed in the Y-axis direction, accordingly increases a resolution of an image formed by the light projected by optical reflection device 1008 to provide a high-definition image projector.

In optical reflection device 1008 according to Embodiment 5, mirror 92 is surrounded by tuning fork vibrators 4 and 104, and outer peripheries of tuning fork vibrators 4 and 104 are surrounded by supporter 6. Further, supporter 6 is surrounded by tuning fork vibrators 26 and 126, and outer peripheries of tuning fork vibrators 26 and 126 are surrounded by supporter 29. Mirror 92, tuning fork vibrators 4, 26, 104, and 126, and supports 6 and 29 are arranged on a plane with a small gap between them, to reduce a dead space of device 1008, hence providing small device 1008.

Each of driver elements 11, 111, 211, 311, 411, 511, 611, and 711 are formed only on one surface of each of arms 8, 9, 108, 109, 31, 32, 131, and 132. The driver elements having the same structure may be provided on opposite surfaces to the surfaces on which driver elements 11, 111, 211, 311, 411, 511, 611, and 711 of arms 8, 9, 108, 109, 31, 32, 131, and 132 are provided, respectively. Tuning fork vibrators 1 and 104 have areas smaller than those of tuning fork vibrators 26 and 126, and produce a small force to drive mirror 92. The driver elements may be provided on both surfaces opposite to each other of fork vibrators 4 and 104 out of tuning fork vibrators 4, 26, 104, and 126.

Optical reflection device 1008 provides a small image projector and a small laser exposure machine.

In optical reflection device 1008 according to Embodiment 5, support beams 25, 28, 125, and 128 have the meander shapes to allow supporter 6 and mirror 92 to vibrate with large amplitude. Alternatively support beams 25, 28, 125, and 128 may have linear shapes.

In optical reflection device 1008 according to Embodiment 5, in order to increase the ratio fH/fV of the frequency fH of the vibration about center axis S1 to the frequency fV of the vibration about center axis S2, support beams 25, 28, 115, and 128 have the meander shape, and support beams 3, 5, 103, and 105 have the linear shape. In optical reflection device 1008 according to Embodiment 5, similarly to optical reflection device 1006 shown in FIG. 11A, support beams 3, 5, 103, and 105 may have meander shapes. This structure increases the amplitude of the vibrations of tuning fork vibrators 4 and 104 about center axis S1 while the ratio fH/fV is hardly increased larger than that of optical reflection device 1008. If support beams 3, 5, 103, and 105 have the meander shapes, the lengths of support beams 25, 28, 125, and 128 can be longer than the lengths of support beams 3, 5, 103, and 105 in order to increase the ratio fH/fV of the frequencies. The length can easily be adjusted by changing the number of turning points of the meander shape.

If support beams 3, 5, 303, and 305 have the meander shapes, support beams 3 and 5 are preferably symmetrical to each other about vibration center 10, and support beams 303 and 305 are symmetrical to each other about vibration center 110. This structure balances whole optical reflection device 1008 in weight, and suppresses the generation of the unnecessary vibration so as to allow the light to scan the screen accurately.

Ends 3A, 3B, 5A, 5B, 103A, 103B, 105A, and 105B of support beams 3, 5, 103, and 105 are preferably located on center axis S1. This arrangement suppresses the generation of the unnecessary vibration to efficiently transmit rotational vibration energy of support beams 3, 5, 103, and 105.

Support beams 3, 5, 103, and 105 preferably have the same shape. This structure allows the resonant frequencies of support beams 3, 5, 103, and 105 to match each other to efficiently vibrate mirror 92. The generation of the unnecessary vibration can be reduced by locating the gravity centers of support beams 3, 5, 103, and 105 on center axis S2.

If support beams 25, 28, 125, and 128 have the meander shapes, the monitor element is disposed on support beam 25 or 28, and another monitor element is disposed on support beam 125 or 128, which allows the vibrations of tuning fork vibrators 26 and 126 to be efficiently detected. If the monitor elements are disposed on support beams 28 and 128, a distance from the monitor element to a terminal electrode can be shortened via the lead lines.

Optical reflection device 1008 may further include support bars 21, 121, 221, and 321 shown in FIG. 11A. Optical reflection device 1008 may further include a support bar that joins arm 31 and support beam 25, a support bar that joins arm 32 and support beam 25, a support bar that joins arm 131 and support beam 125, and a support bar that joins arm 132 and support beam 125.

The twisting vibrator including support beams 25 and 125 and supporter 6 vibrates also by the high-order standing wave of the resonant frequency. A position to which the support bars of support beams 25 and 125 are connected is preferably provided at the node of the high-order standing wave. The warping of arms 31, 32, 131, and 132 is hardly suppressed since the amplitude of the vibration at the node of the vibration is extremely small. Additionally, vibration energy of tuning fork vibrators 26 and 126 can propagate efficiently to support beams 25 and 125. The support bars are preferably provided at positions closer to vibration center 27 and 127 of tuning fork vibrators 26 and 126 so as to suppress the movement of arms 31, 32, 131, and 132.

Similarly to optical reflection device 1006 of FIG. 11A, optical reflection device 1008 may further include elastic member 24 that connects arms 8 and 108, elastic member 124 that connects arms 9 and 109, elastic member 224 that connects arms 31 and 131, and elastic member 324 that connects arms 32 and 132. Elastic members 224 and 324 are preferably made of material having a large stretching property in a direction in which arms 31, 32, 131, and 132 extend. A deviation of resonant frequency can be reduced in tuning fork vibrators 4 and 104 by elastic member 24 and 124, tuning fork vibrators 4 and 104 can warp symmetrically, and the unnecessary vibrations of arms 8, 9, 108, and 109 can be suppressed to efficiently vibrate tuning fork vibrators 4 and 104. The deviation of resonant frequency can be reduced in tuning fork vibrators 26 and 126 by elastic members 224 and 324, tuning fork vibrators 26 and 126 can warp symmetrically, and the unnecessary vibrations of arms 31, 32, 131, and 132 can be suppressed to efficiently vibrate tuning fork vibrators 26 and 126.

Figure 14:
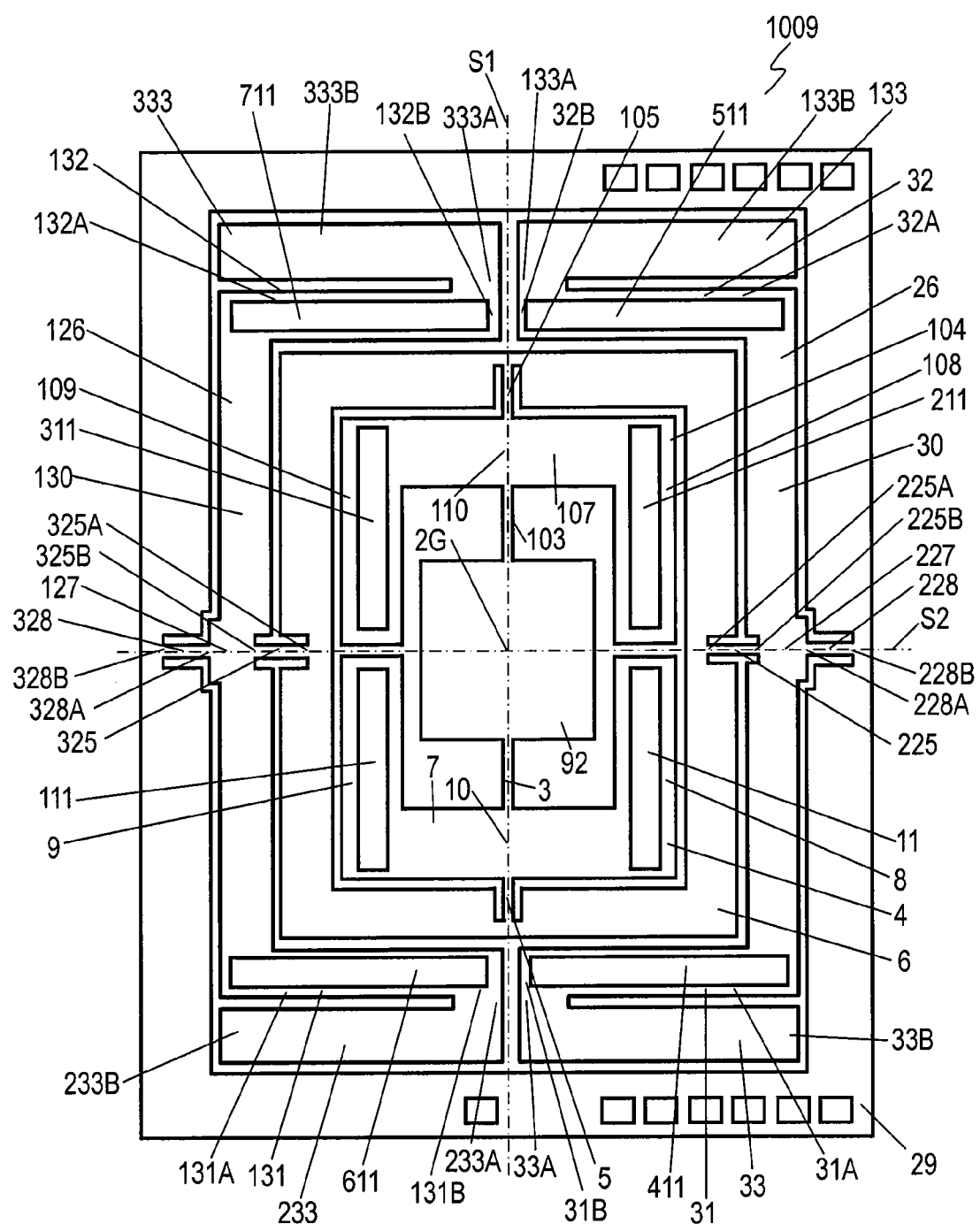
FIG. 14 is a plan view of another optical reflection device according to Embodiment 5.

FIG. 14 is a plan view of another optical reflection device 1009 according to Embodiment 5. In FIG. 14, components identical to those of optical reflection device 1008 shown in FIG. 12 are denoted by the same reference numerals, and their description will be omitted. Optical reflection device 1009 shown in FIG. 14 includes support beams 225, 228, 325, and 328 having linear shapes instead of support beams 25, 28, 125, and 128 of optical reflection device 1008 illustrated in FIG. 12. Support beams 225, 228, 325, and 328 have the linear shapes extending along center axis S2. Support beam 225 has end 225A connected to supporter 6 and end 225B connected to joining portion 30 of tuning fork vibrator 26. End 225A of support beam 225 is located on an opposite side to end 225B along center axis S2. Support beam 325 has end 325A connected to supporter 6 and end 325B connected to joining portion 130 of tuning fork vibrator 126. End 325A of support beam 325 is located on an opposite side to end 325B along center axis S2. Support beam 228 has end 228A connected to joining portion 30 of tuning fork vibrator 26 and end 228B connected to supporter 29. End 228A of support beam 228 is located on an opposite side to end 228B along center axis S2. Support beam 328 has end 328A connected to joining portion 130 of tuning fork vibrator 126 and end 328B connected to supporter 29. End 328A of support beam 328 is located on an opposite side to end 328B along center axis S2.

Similarly to optical reflection device 1002 shown in FIG. 5, a projection functioning as a weight may be provided at each of ends 8B, 9B, 108B, and 109B of arms 8, 9, 108, and 109.

Projection 33, 133, 233, and 333 functioning as weights are connected to ends 31B, 32B, 131B, and 132B of arms 31, 32, 131, and 132, respectively. Projection 33 includes portion 33A extending from end 31B of arm 31 away from center axis S2 and portion 33B extending from portion 33A. Portion 33B of projection 33 extends in a direction from end 31B of arm 31 toward end 31A. Projection 133 includes portion 133A extending from end 32B of arm 32 away from center axis S2 and portion 133B extending from portion 133A. Portion 133B of projection 133 extends in a direction from end 32B of arm 32 toward end 32A. Projection 233 includes portion 233A extending from end 131B of arm 131 away from center axis S2 and portion 233B extending from portion 233A. Portion 233B of projection 233 extends in a direction from end 131B of arm 131 toward end 131A. Projection 333 includes portion 333A extending from end 132B of arm 132 away from center axis S2 and portion 333B extending from portion 333A. Portion 333B of projection 333 extends in a direction from end 132B of arm 132 toward end 132A. This structure reduces an area of element 1009.

Figure 15:
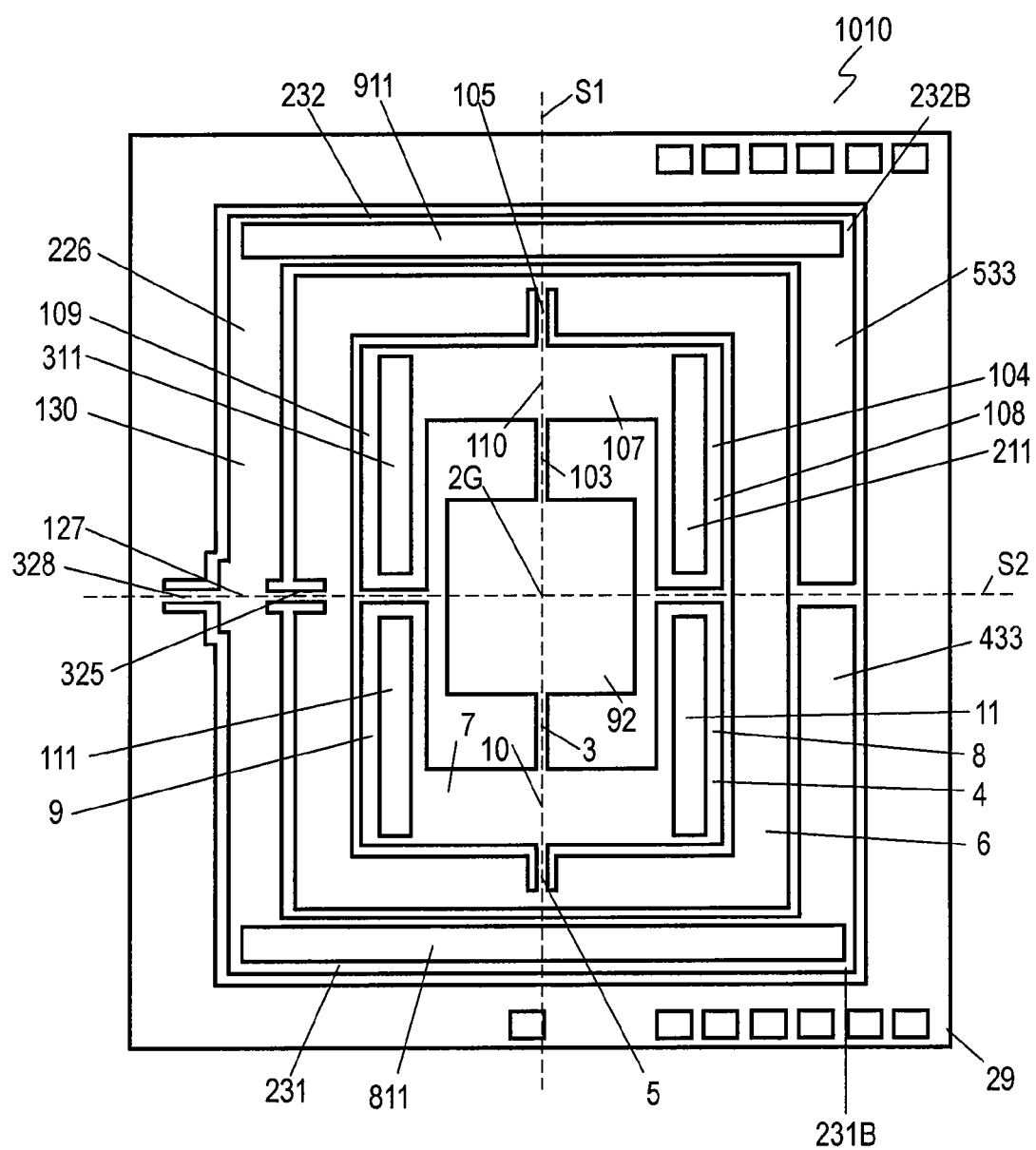
FIG. 15 is a plan view of still another optical reflection device according to Embodiment 5.

FIG. 15 is a plan view of still another optical reflection device 1010 according to Embodiment 5. In FIG. 15, components identical to those of as optical reflection device 1009 shown in FIG. 14 are denoted by the same reference numerals, and their description will be omitted. Optical reflection device 1010 shown in FIG. 15 includes single tuning fork vibrator 226 instead of two tuning fork vibrators 26 and 126 of optical reflection device 1009 illustrated in FIG. 14. Tuning fork vibrator 226 has a tuning fork shape including joining portion 130 and arms 231 and 232. Joining portion 130 is located on center axis S2 and connected to ends 325B and 328A of support beams 325 and 328. Arms 231 and 232 extend substantially in parallel with center axis S2 from joining portion 130. Arms 231 and 232 has linear shapes having ends 231A and 232A connected to joining portion 130 and ends 231B and 232B that are located on opposite sides to ends 231A and 232A in the direction of center axis S2. Arms 231 and 232 are arranged in the direction perpendicular to center axis S2 while separated from center axis S2. Arms 231 and 232 are located symmetrically to each other about center axis S2. Supporter 6 is located between arms 231 and 232. Driver elements 811 and 911 are provided on arms 231 and 232, respectively. Driver elements 811 and 911 warp and vibrate arms 231 and 232, thereby vibrating tuning fork vibrator 226. Joining portion 130 of tuning fork vibrator 226 is connected to supporter 29 via support beam 328, and is movable with respect to supporter 29. Tuning fork vibrator 226 has a shape symmetrical about center axis S2.

Tuning fork vibrator 226 may further include projections 33 and 133 extending toward center axis S2 from ends 231B and 232B of arms 231 and 232, respectively. Projections 33 and 131 extend toward center axis S2 from ends 231B and 232B of arms 231 and 232, allowing a twisting vibration of tuning fork vibrator 226 to be more efficiently generated. Ends 231B and 232B of arms 231 and 232 function as fulcrum points of projection 33 and 133 functioning as weights, respectively. Projection 33 and 133 are displaced in the thickness direction with the fulcrum points as the axes, thereby generating inertia moment in tuning fork vibrator 226. If projection 33 and 131 extend toward center axis S2 from ends 231B and 232B of arms 231 and 232, respectively, the inertia moment is generated in a direction facilitating the twisting vibration of tuning fork vibrator 226, thus increasing amplitude of the vibration of tuning fork vibrator 226. This increases the amplitude of the repetitive rotational vibration of mirror 92, providing optical reflection device 1010 with a small size.

An outer periphery of supporter 6 is surrounded by joining portion 130, arms 231 and 232, and projections 33 and 133 of tuning fork vibrator 226, hence providing optical reflection device 1010 with a small size.

Exemplary Embodiment 6

Figure 16:
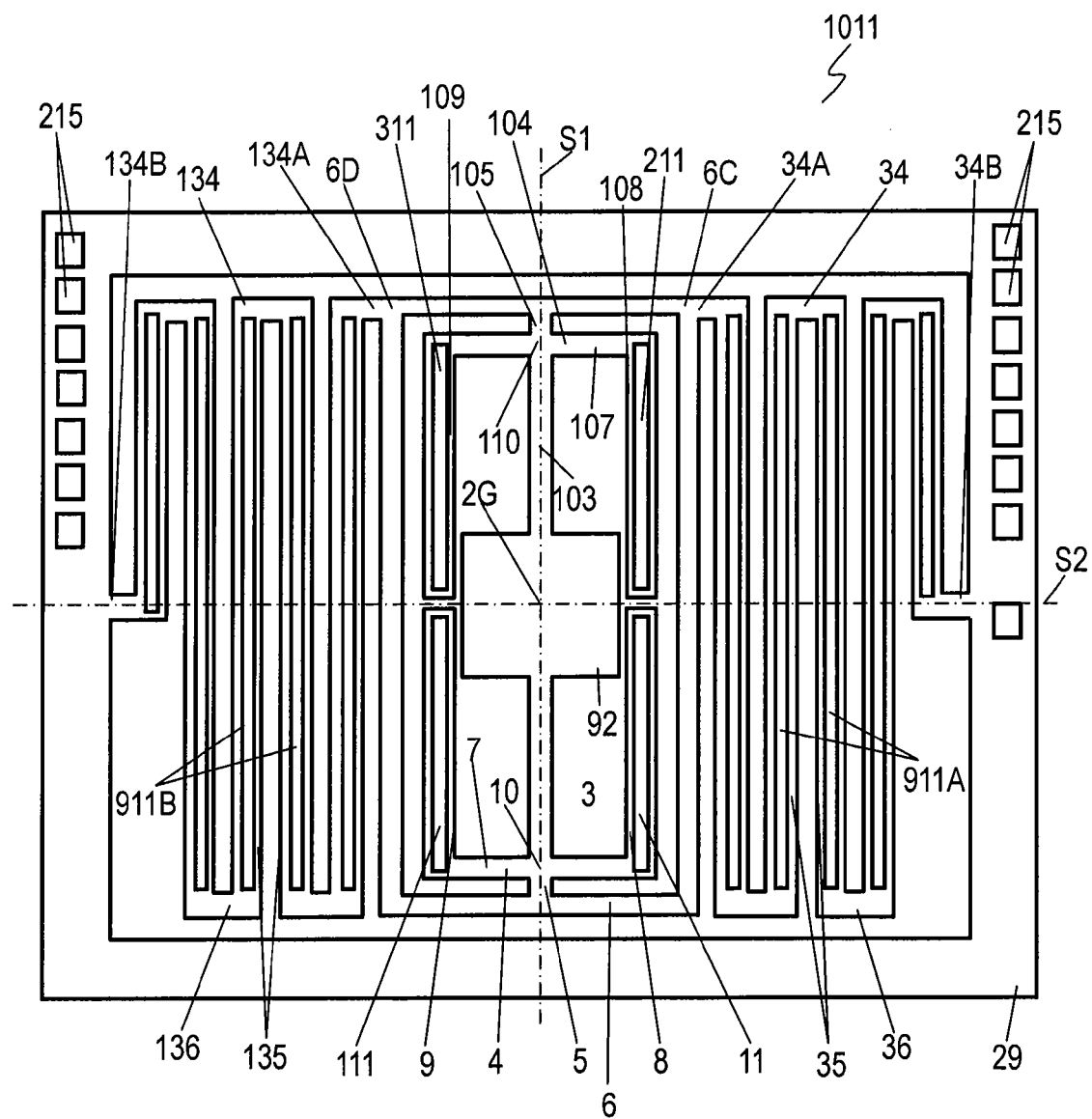
FIG. 16 is a plan view of an optical reflection device according to Exemplary Embodiment 6 of the invention.

FIG. 16 is a plan view of optical reflection device 1011 according to Exemplary Embodiment 6. In FIG. 16, components identical to those of optical reflection device 1009 according to Embodiment 5 illustrated in FIG. 14 are denoted by the same reference numerals, and their description will be omitted. Optical reflection device 1011 according to Embodiment 6 illustrated in FIG. 16 includes meander vibrating beams 34 and 134 instead of tuning fork vibrators 26 and 126 and support beams 25, 28, 125, and 128 of optical reflection device 1009 according to Embodiment 5 illustrated in FIG. 14.

Meander vibrating beam 34 has end 34A connected to supporter 6 and end 34B connected to supporter 29. End 34B is located on an opposite side to end 34A. Meander vibrating beam 34 has a meander shape extending from end 34A to end 34B while meandering along center axis S2. Meander vibrating beam 134 has end 134A connected to supporter 6 and end 134B connected to supporter 29. End 134B is located on an opposite side to end 134A. Meander vibrating beam 134 has a meander shape extending from end 134A to end 134B while meandering along center axis S2. Supporter 29 has a frame shape surrounding outer peripheries of meander vibrating beams 34 and 134 and supporter 6.

Meander vibrating beams 34 and 134 are symmetrical to each other about center axis S1. Ends 34A and 134A of meander vibrating beams 34 and 134 are connected to corners 6C and 6D of supporter 6 located away from center axis S2 in the same direction, respectively. Corners 6C and 6D are provided at positions that are symmetrical to each other about center axis S1. Meander vibrating beam 34 extends while meandering along center axis S2. Meander vibrating beam 34 includes plural vibrating portions 35 extending in parallel with center axis S1 and plural turning joining portions 36 joined to plural vibrating portions 35. Plural vibrating portions 35 extend on a single plane. Meander vibrating beam 134 extending while meandering along center axis S2 includes plural vibrating portions 135 extending in parallel with center axis S1 and plural turning joining portions 136 joined to plural vibrating portions 135. Plural vibrating portions 135 extend on a single plane.

According to Embodiment 6, ends 34A and 134A of meander vibrating beams 34 and 134 are connected not to sides of supporter 6 but to corners 6C and 6D. This structure generates the rotational vibration of supporter 6 about center axis S2 with large amplitude based on a principle of leverage. Ends 34B and 134B of meander vibrating beams 34 and 134 connected to supporter 29 are located on center axis S2, so that meander vibrating beams 34 and 134 can stably generates the rotational vibration about center axis S2.

Plural driver elements 911A are provided on plural vibrating portions 35 of meander vibrating beam 34, respectively. Plural driver elements 911B are provided on plural vibrating portions 135 of meander vibrating beam 134, respectively. Similarly to driver element 11 sown in FIG. 2, each of driver elements 911A and 911B includes lower electrode layer 12 provided on base material 16, piezoelectric layer 13, and upper electrode layer 14.

An operation of optical reflection device 1011 according to Embodiment 6 will be described below.

Similarly to optical reflection device 1009 according to Embodiment 5, warping vibration of arms 8 and 9 of tuning fork vibrator 4 is generated such that arms 8 and 9 are displaced in directions opposite to each other. Warping vibration of arms 108 and 109 of tuning fork vibrator 104 is generated such that arms 108 and 109 are displaced in directions opposite to each other. Therefore, the twisting vibrator including support beams 3 and 103 and mirror 92 generates the repetitive rotational vibration about center axis S1 in a direction opposite to the twisting directions of tuning fork vibrators 4 and 104. The repetitive rotational vibration of mirror 92 is generated about center axis S1.

The warping vibration of plural vibrating portions 35 and 135 of meander vibrating beams 34 and 134 is generated by applying AC voltages to plural driver elements 911A and 911B. At this moment, plural vibrating portions 35 and 135 generate warping vibrations in directions opposite to each other by applying AC voltages having the reverse polarities to vibrating portions adjacent to each other.

Figure 17:
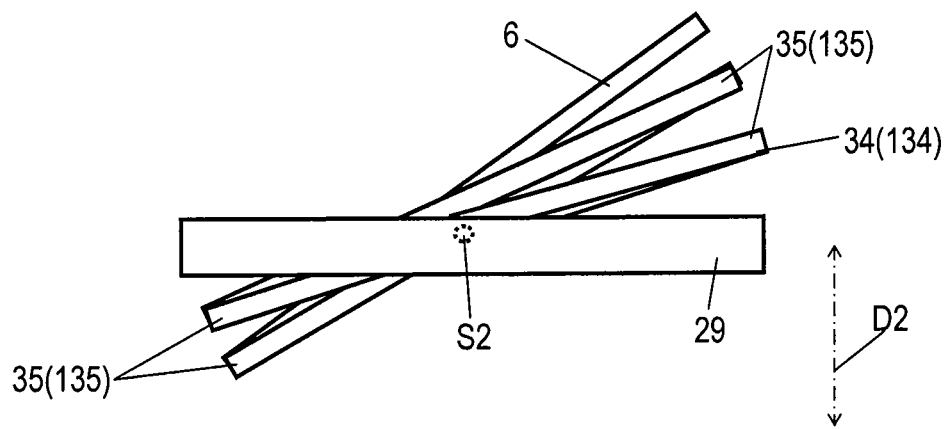
FIG. 17 is a side view of the optical reflection device according to Embodiment 6 for illustrating an operation of the optical reflection device.

FIG. 17 is a side view of optical reflection device 1011 for an operation of device 1011. In plural vibrating portions 35 and 135 of meander vibrating beams 34 and 134, the vibrating portions adjacent to each other warp in directions opposite to each other, and the warping of vibrating portions 35 and 135 are accumulated about center axis S2 according to the numbers of vibrating portions 35 and 135, thereby generating the repetitive rotational vibration of supporter 6 with large amplitude. Therefore, the repetitive rotational vibration of mirror 92 about center axis S2 can be generated with large amplitude while point 2G that is the gravity center of mirror 92 is fixed.

Plural driver elements 911A and 911B of FIG. 16 are provided on all plural vibrating portions 35 and 135 of meander vibrating beams 34 and 134. Alternatively, plural driver elements 911A may be provided alternately on plural vibrating portions 35 while plural driver elements 911B are provided alternately on plural vibrating portions 135. In this case, the AC voltages having the same polarities are applied to plural driver elements 911A and 911B. Therefore, in plural vibrating portions 35 and 135, the warping vibration of the vibrating portions adjacent to each other can be generated in directions opposite to each other by the resonance.

In optical reflection device 1011 according to Embodiment 6, the AC voltages having the same polarities may be applied to the vibrating portions adjacent to each other in plural vibrating portions 35 and 135. At this moment, ends 34A and 134A of meander vibrating beams 34 and 134 are displaced and vibrated in direction D2 perpendicular to center axes S1 and S2. Therefore, the repetitive rotational vibration of mirror 92 about center axis S2 can be generated while point 2G that is the gravity center of mirror 92 is fixed.

Meander vibrating beams 34 and 134 can vibrate mirror 92 about center axis S2 at the low frequency fV. Accordingly, the ratio fH/fV of the frequency fH to the frequency fV can be increased in the repetitive rotational vibration of mirror 92 about center axis S1 by tuning fork vibrators 4 and 104.

The frequency in the repetitive rotational vibration of mirror 92 about center axis S1 can be increased by tuning fork vibrators 4 and 104. The frequency fV in the repetitive rotational vibration of mirror 92 about center axis S2 can be decreased by increasing lengths of vibrating portions 35 and 135. Accordingly, the ratio fH/fV of the frequency fH in the repetitive rotational vibration of mirror 92 about center axis S1 to the frequency fV in the repetitive rotational vibration of mirror 92 about center axis S2 can be increased.

The optical reflection device according to Embodiment 6 may not necessarily include meander vibrating beams 34 and 134, hence having a small size. In the optical reflection device according to Embodiment 6, since the frequency fV in the repetitive rotational vibration of mirror 92 about center axis S2 can further be decreased, the ratio fH/fV of the frequency fH in the repetitive rotational vibration of mirror 92 about center axis S1 to the frequency fV can further be increased.

Exemplary Embodiment 7

Figure 18:
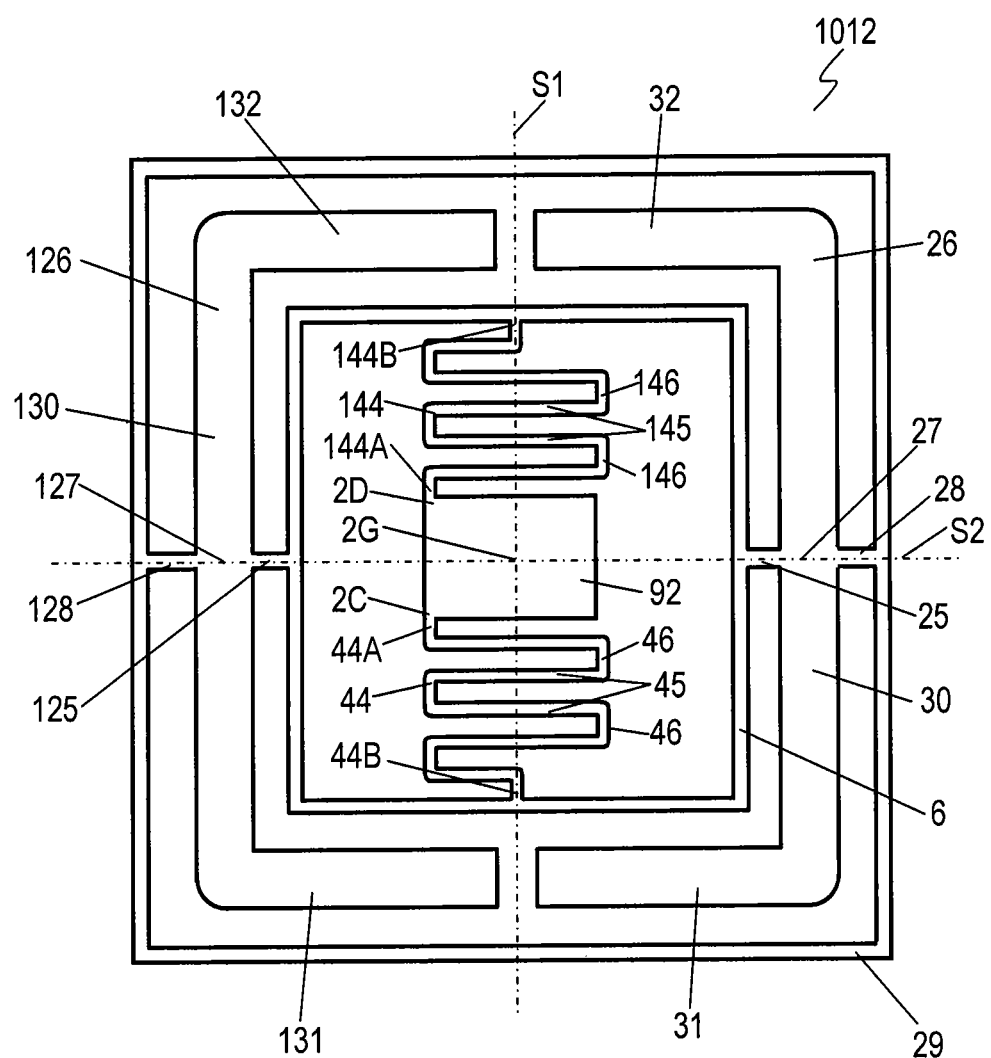
FIG. 18 is a plan view of an optical reflection device according to Exemplary Embodiment 7 of the invention.

FIG. 18 is a plan view of optical reflection device 1012 according to Exemplary Embodiment 7. In FIG. 18, components identical to those of optical reflection device 1009 according to Embodiment 5 illustrated in FIG. 14 are denoted by the same reference numeral, and their description will be omitted. Optical reflection device 1012 according to Embodiment 7 illustrated in FIG. 18 includes meander vibrating beams 44 and 144 instead of tuning fork vibrators 4 and 104 and support beams 3, 5, 103, and 105 of optical reflection device 1009 according to Embodiment 5 illustrated in FIG. 14.

Meander vibrating beam 44 has end 44A connected to mirror 92 and end 44B connected to supporter 6. End 44B is located on an opposite side to end 44A. Meander vibrating beam 44 has a meander shape extending from end 44A to end 44B while meandering along center axis S1. Meander vibrating beam 144 includes end 144A connected to mirror 92 and end 144B connected to supporter 6. End 144B is located on an opposite side to end 144A. Meander vibrating beam 144 has a meander shape extending from end 144A to end 144B while meandering along center axis S1. Supporter 6 has a frame shape surrounding meander vibrating beams 44 and 144 and mirror 92.

Meander vibrating beams 44 and 144 are symmetrical to each other about center axis S2. Ends 44A and 144A of meander vibrating beams 44 and 144 are connected to corners 2C and 2D of mirror 92 located away from center axis S1 in the same direction, respectively. Corners 2C and 2D are provided at positions symmetrical to each other about center axis S2. Meander vibrating beam 44 extending while meandering along center axis S1 includes plural vibrating portions 45 extending in parallel with center axis S2 and plural turning joining portions 46 that are joined to plural vibrating portions 45. Plural vibrating portions 45 extend on a single plane. Meander vibrating beam 144 extending while meandering along center axis S1 includes plural vibrating portions 145 extending in parallel with center axis S2 and plural turning joining portions 146 that are joined to plural vibrating portions 145. Plural vibrating portions 145 extend on a single plane.

According to Embodiment 7, ends 44A and 144A of meander vibrating beams 44 and 144 are connected not to sides of mirror 92 but to corners 2C and 2D, hence generating the rotational vibration of mirror 92 about center axis S1 with large amplitude based on the principle of leverage. Ends 44B and 144B of meander vibrating beams 44 and 144 connected to supporter 6 are located on center axis S1 so as to stably the rotational vibration generate that meander vibrating beams 44 and 144 about center axis S1.

Thus, second tuning fork vibrator 26 provides small optical reflection device 1012 having high driving efficiency.

Similarly to meander vibrating beams 34 and 134 according to Embodiment 7 illustrated in FIGS. 16 and 17, the warping vibration is generated in plural vibrating portions 45 and 145 of meander vibrating beams 44 and 144. At this moment, in plural vibrating portions 45 and 145, the vibrating portions adjacent to each other warp and vibrate in directions opposite to each other. In plural vibrating portions 45 and 145 of meander vibrating beams 44 and 144, the vibrating portions adjacent to each other warp in directions opposite to each other. The warping of vibrating portions 45 and 145 accumulate about center axis S1 according to the numbers of vibrating portions 45 and 145, generating the repetitive rotational vibration of support 92 with large amplitude. Therefore, the repetitive rotational vibration of mirror 92 about center axis S1 can be generated with large amplitude while point 2G that is the gravity center of mirror 92 is fixed.

According to Embodiment 7, optical reflection device 1012 includes meander vibrating beams 44 and 144 connected to mirror 92. Alternatively, optical reflection device 1012 may include a vibrating beam having another shape instead of meander vibrating beams 44 and 144.

Exemplary Embodiment 8

Figure 19:
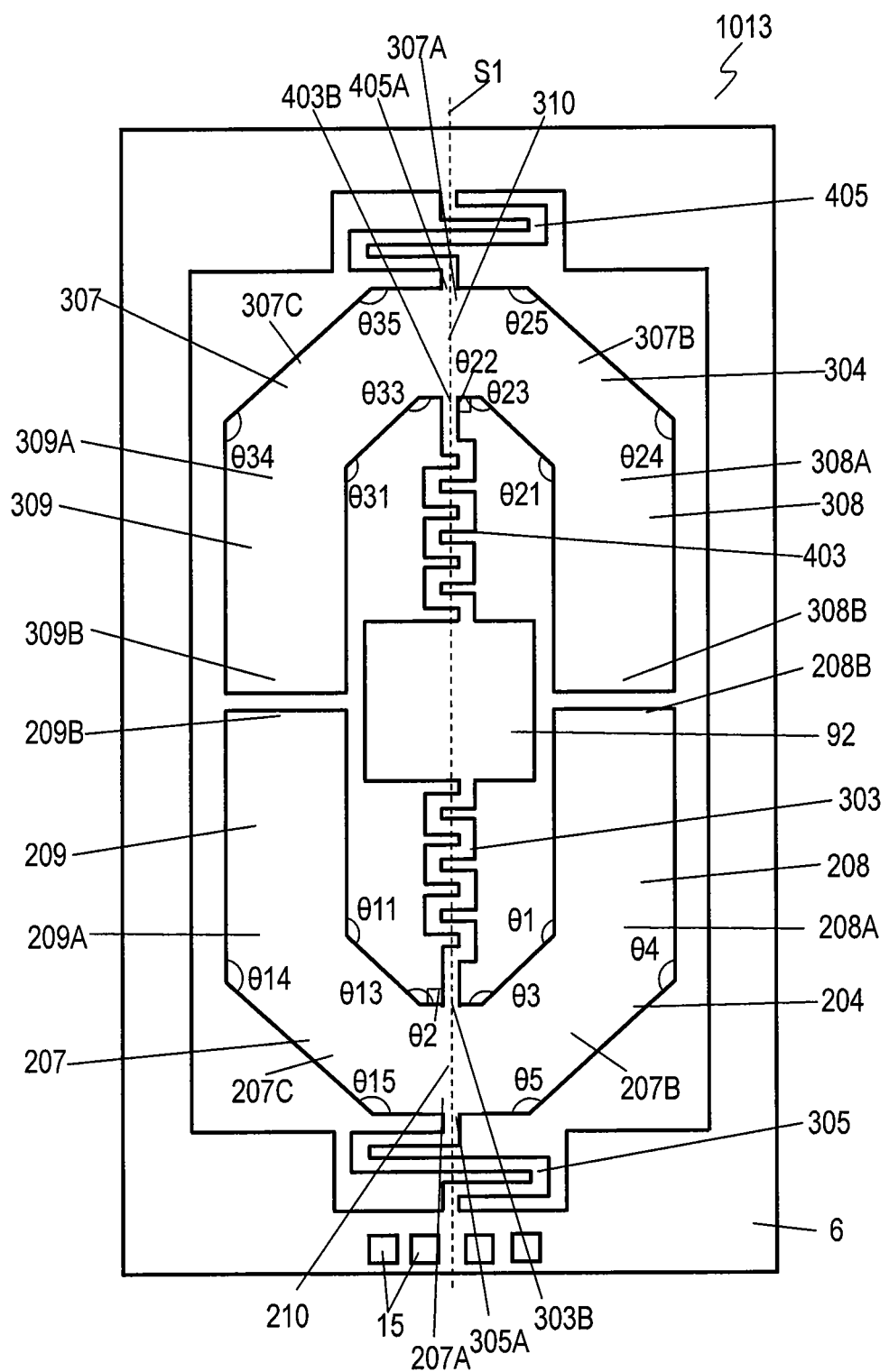
FIG. 19 is a plan view of an optical reflection device according to Exemplary Embodiment 8 of the invention.

FIG. 19 is a plan view of optical reflection device 1013 according to Exemplary Embodiment 8. In FIG. 19, components identical to those of optical reflection device 1006 according to Embodiment 5 illustrated in FIG. 11A are denoted by the same reference numerals, and their description will be omitted. Optical reflection device 1013 illustrated in FIG. 19 includes tuning fork vibrators 204 and 304 instead of tuning fork vibrators 4 and 104 of optical reflection device 1006 according to Embodiment 4 illustrated in FIG. 11A.

Tuning fork vibrator 204 has a tuning fork shape including joining portion 207 and arms 208 and 209. Joining portion 207 is located on center axis S1. Arms 208 and 209 extend substantially in parallel with center axis S1 from joining portion 207. Arms 208 and 209 have linear shapes having ends 208A and 209A and ends 208B and 209B, respectively. Ends 208A and 209A are connected to joining portion 207. Ends 208B and 209B are located on opposite sides to ends 208A and 209A in the direction of center axis S1. Nothing is connected to ends 208B and 209B, and ends 208B and 209B are free ends that are opened. Arms 208 and 209 are arranged in direction D1 perpendicular to center axis S1 while separated from center axis S1. Arms 208 and 209 are disposed symmetrically to each other about center axis S1. Mirror 92 is located between arms 208 and 209. Driver elements are provided on arms 208 and 209. The driver elements bend and vibrate arms 208 and 209, thereby vibrating tuning fork vibrator 204. End 303B of support beam 303 and end 305A of support beam 305 are connected to joining portion 207. Joining portion 207 of tuning fork vibrator 204 is connected to supporter 6 via support beam 305, and is movable with respect to supporter 6. Tuning fork vibrator 204 has a shape symmetrical about center axis S1.

Tuning fork vibrator 304 has a tuning fork shape including joining portion 307 and arms 308 and 309. Joining portion 307 is located on center axis S1. Arms 308 and 309 extend substantially in parallel with center axis S1 from joining portion 307. Arms 308 and 309 have linear shapes having ends 308A and 309A and ends 308B and 309B, respectively. Ends 308A and 309A are connected to joining portion 307. Ends 308B and 309B are located on opposite sides to ends 308A and 309A in the direction of center axis S1. Nothing is connected to ends 308B and 309B, and ends 308B and 309B are free ends that are opened. Arms 308 and 309 are arranged in direction D1 perpendicular to center axis S1 while separated from center axis S1. Arms 308 and 309 are disposed symmetrically to each other about center axis S1. Mirror 92 is located between arms 308 and 309. The driver elements are provided on arms 308 and 309, respectively. The driver elements warp and vibrate arms 308 and 309, thereby vibrating tuning fork vibrator 304. End 403B of support beam 403 and end 405A of support beam 405 are connected to joining portion 307. Joining portion 307 of tuning fork vibrator 304 is connected to supporter 6 via support beam 305, and is movable with respect to supporter 6. Tuning fork vibrator 304 has a shape symmetrical about center axis S1.

Optical reflection device 1013 operates similarly to optical reflection device 1006 according Embodiment 4 illustrated in FIG. 11A.

Angle $\theta 1$ defined between an inner side of arm 208 facing center axis S1 and an inner side of joining portion 207 is an obtuse angle in optical reflection device 1013. Joining portion 207 includes a center portion 207A connected to support beam 303 and support beam 305 and inclined end portions 207B and 207C that obliquely extending with respect to center axis S1. Inclined end portions 207B and 207C are connected to ends 208A and 209A of arms 208 and 209, respectively.

Center portion 207A of joining portion 207 extends perpendicularly to center axis S1 ($\theta 2=90°$). Inclined end portions 207B and 207C are symmetrical to each other about center axis S1. Angle θ3 defined by an inner side of center portion 207A of joining portion 207 and an inner side of inclined end portion 207B is an obtuse angle. Angle θ13 defined by an inner side of center portion 207A of joining portion 207 and an inner side of inclined end portion 207C is an obtuse angle. Angle θ1 defined by am inner side of inclined end portion 207B of joining portion 207 and an inner side of arm 208 is an obtuse angle. Angle θ11 defined by an inner side of center portion 207C and an inner side arm 209 is an obtuse angle. Angle θ5 defined by an outer side of center portion 207A of joining portion 207 and an outer side inclined end portion 207B is an obtuse angle. Angle θ15 defined by an outer side of center portion 207A of joining portion 207 and an outer side of inclined end portion 207C is an obtuse angle. Angle θ4 defined by an outer side of inclined end portion 207B of joining portion 207 and an outer side of arm 208 is an obtuse angle. Angle θ14 defined by an outer side of inclined end portion 207C and an outer side of arm 209 is an obtuse angle.

Center portion 307A of joining portion 307 extends perpendicularly to center axis S1 (θ22=90°). Inclined end portions 307B and 307C are symmetrical to each other about center axis S1. Angle θ23 defined by an inner side of center portion 307A of joining portion 307 and an inner side of inclined end portion 307B is an obtuse angle. Angle θ33 defined by an inner side of center portion 307A of joining portion 307 and an outer side of inclined end portion 307C is an obtuse angle. Angle θ21 defined by an inner side of center portion 307B of joining portion 307 and an inner side of arm 308 is an obtuse angle. Angle θ31 defined by an inner side of inclined end portion 307C and an inner side of arm 309 is an obtuse angle. Angle θ25 defined by an outer side of center portion 307A of joining portion 307 and an outer side of inclined end portion 307B is an obtuse angle. Angle θ35 defined by an outer side of center portion 307A of joining portion 307 and an outer side of inclined end portion 307C is an obtuse angle. Angle θ24 defined by an outer side of inclined end portion 307B of joining portion 307 and an outer side of arm 308 is an obtuse angle. Angle θ34 defined by an outer side of inclined end portion 307C and an outer side of arm 309 is an obtuse angle.

As described above, angles θ1, θ21, θ31, and θ41 defined by the inner sides of arms 208, 209, 308, and 309 and the inner sides of joining portions 207 and 307 are obtuse angles so as to connect arms 208 and 209 smoothly to joining portion 207, and to connect arms 308 and 309 smoothly to joining portion 307. This allows vibration energy of arms 208 and 209 to propagate efficiently to joining portion 207, and allows vibration energy of arms 308 and 309 to propagate efficiently to joining portion 307. Therefore, the turning angle can be increased in the twisting vibrator including support beams 303 and 403 and mirror 92, causing mirror 92 to rotate and vibrate with a large angle.

According to Embodiment 8, angles θ3 and θ13 defined by the inner side of center portion 207A of joining portion 207 and the inner sides of inclined end portions 207B and 207C are obtuse angles. Angles θ23 and θ33 defined by the inner side of center portion 307A of joining portion 307 and the inner sides of inclined end portions 307B and 307C are obtuse angles. Therefore, the vibration energy propagates efficiently from inclined end portions 207B, 207C, 307B, and 307C of joining portions 207 and 307 to vibration center 210 and 310 of center portions 207A and 307A, accordingly vibrating mirror 92 with large amplitude.

Angles θ4, θ14, θ24, and θ34 defined by the outer sides of arms 208, 209, 308, and 309 and the outer sides of joining portions 207 and 307 are obtuse angles. Angles θ5, θ15, θ25, and θ35 that are located on the outer side of joining portions 207 and 307 are obtuse angles. This structure allows the width of joining portions 207 and 307 to arms 8, 209, 308, and 309 to be constant, and increases amplitude of the vibration of mirror 92. If the width is large locally at the middle of the path through which the vibration energy propagates, the propagation efficiency of the vibration energy is lowered due to the diffuse of the energy. Accordingly, the diffusion of the vibration energy can be reduced by maintaining the width in the path through which the vibration energy propagates from arms 208, 209, 308, and 309 to joining portions 207 and 209.

Angles θ2 and θ22 defined by joining portions 207 and 307 and center axis S1 are a right angle, thereby center portion 207A located near the vibration center 210 of joining portion 207 and center portion 307A located near vibration center 310 of joining portion 307 can be formed into the linear shapes. Therefore, the vibration energy of arm 208 and the vibration energy of arm 209 can efficiently be concentrated on vibration center 210. The vibration energy of arm 308 and the vibration energy of arm 309 can efficiently be concentrated on vibration center 310. The amplitude can further be increased in the vibration of mirror 92.

Similarly, in tuning fork vibrators 26 and 126 of optical reflection device 1008 according to Embodiment 5 illustrated in FIG. 12, the angles defined by the inner sides of arms 31 and 32 and the inner sides of joining portion 30 are obtuse angles. The angles defined by the inner sides if arms 131 and 132 and the inner side of joining portion 130 are obtuse angles, increasing the amplitude of the vibration of supporter 6. Additionally, the angles defined by the outer sides of arms 31 and 32 and the outer side of joining portion 30 are obtuse angles. The angles defined by the outer sides of arms 131 and 132 and the outer side of joining portion 130 are obtuse angles, allowing supporter 6 to efficiently vibrate.

INDUSTRIAL APPLICABILITY

An optical reflection device according to the present invention can have a small size, and is useful to small devices, such as electrophotographic copying machine, a laser printer, and an optical scanner.

The invention claimed is:
1. An optical reflection device comprising:
a mirror having a reflection surface configured to reflect light;
a first support beam having a first end connected to the mirror and a second end located on an opposite side to the first end, the first support beam extending along a first center axis;
a first tuning fork-shaped vibrator including
a first joining portion connected to the second end of the first support beam,
a first arm extending from the first joining portion, and
a second arm extending from the first joining portion;
a second support beam having a third end connected to the first joining portion of the first tuning fork-shaped vibrator and a fourth end located on an opposite side to the third end, the second support beam extending along the first center axis;
a first supporter connected to the fourth end of the second support beam; and
a first driver element provided on the first arm of the first tuning fork-shaped vibrator;
wherein the first arm and the second arm are formed on a virtual plane, and the first driver element warps the first arm of the first tuning fork-shaped vibrator in a direction perpendicular to the virtual plane.

2. The optical reflection device according to claim 1, wherein
the first support beam has a meander shape extending from the first end to the second end while meandering along the first center axis, and
the second support beam has a meander shape extending from the third end to the fourth end while meandering along the first center axis.

3. The optical reflection device according to claim 1, further comprising a second driver element provided on the second arm of the first tuning fork-shaped vibrator, for warping the second arm of the first tuning fork-shaped vibrator in a direction perpendicular to the virtual plane.

4. The optical reflection device according to claim 1, further comprising a monitor element provided on the second arm of the first tuning fork-shaped vibrator, for detecting warping of the second arm.

5. The optical reflection device according to claim 1, further comprising:
a third support beam having a fifth end and a sixth end, the fifth end being connected to a portion of the mirror opposite to the first end of the first support beam, the sixth end being located on an opposite side to the fifth end, the third support beam extending along the first center axis;
a second tuning fork-shaped vibrator including
a second joining portion connected to the sixth end of the third support beam,
a third arm extending from the second joining portion while separated from the first center axis, and
a fourth arm extending from the second joining portion, the third arm and the fourth arm are symmetrical to each other about the first center axis; and
a fourth support beam having a seventh end and an eighth end, the seventh end being connected to the second joining portion of the second tuning fork-shaped vibrator, the eighth end being located on an opposite side to the seventh end and being connected to the first supporter, the fourth support beam extending along the first center axis.

6. The optical reflection device according to claim 5, wherein
the first support beam has a meander shape extending from the first end to the second end while meandering along the first center axis, and
the third support beam has a meander shape extending from the fifth end to the sixth end while meandering along the first center axis.

7. The optical reflection device according to claim 6, wherein
the second support beam has a meander shape extending from the third end to the fourth end while meandering along the first center axis, and
the fourth support beam has a meander shape extending from the seventh end to the eighth end while meandering along the first center axis.

8. The optical reflection device according to claim 5, wherein
the second support beam has a meander shape extending from the third end to the fourth end while meandering along the first center axis, and
the fourth support beam has a meander shape extending from the seventh end to the eighth end while meandering along the first center axis.

9. The optical reflection device according to claim 5, wherein the first supporter has a frame shape surrounding outer peripheries of the mirror, the first support beam, the first tuning fork-shaped vibrator, and the second support beam.

10. The optical reflection device according to claim 5, further comprising:
a fifth support beam having a ninth end connected to the first supporter and a tenth end located on an opposite side to the ninth end, the fifth support beam extending along a second center axis perpendicular to the first center axis;
a third tuning fork-shaped vibrator including
a third joining portion connected to the tenth end of the fifth support beam,
a fifth arm extending from the third joining portion while separated from the second center axis, and
a sixth arm extending from the third joining portion, the fifth arm and the sixth arm are symmetrical to each other about the second center axis;
a sixth support beam having an eleventh end connected to the third joining portion of the third tuning fork-shaped vibrator and a twelfth end located on an opposite side to the eleventh end, the sixth support beam extending along the second center axis; and
a second supporter connected to the twelfth end of the sixth support beam.

11. The optical reflection device according to claim 10, wherein
the fifth support beam has a meander shape extending from the ninth end to the tenth end while meandering along the second center axis, and
the sixth support beam has a meander shape extending from the eleventh end to the twelfth end while meandering along the second center axis.

12. The optical reflection device according to claim 10, further comprising:
a seventh support beam having a thirteenth end and a fourteenth end located on an opposite side to the thirteenth end, the thirteenth end of the seventh support beam being connected to a portion of the first supporter opposite to the ninth end of the fifth support beam, the seventh support beam extending along the second center axis;
a fourth tuning fork-shaped vibrator including
a fourth joining portion connected to the fourteenth end of the seventh support beam,
a seventh arm extending from the fourth joining portion while separated from the second center axis, and
an eighth arm extending from the fourth joining portion, the seventh arm and the eighth arm being symmetrical to each other about the second center axis; and
an eighth support beam having a fifteenth end and a sixteenth end, the fifteenth end being connected to the fourth joining portion of the fourth tuning fork-shaped vibrator, the sixteenth end being located on an opposite side to the fifteenth end, the sixteenth end being connected to the second supporter, the eighth support beam extending along the second center axis.

13. The optical reflection device according to claim 12, wherein
the seventh support beam has a meander shape extending from the thirteenth end to the fourteenth end while meandering along the second center axis, and
the eighth support beam has a meander shape extending from the fifteenth end to the sixteenth end while meandering along the second center axis.

14. The optical reflection device according to claim 1, wherein the first supporter has a frame shape surrounding outer peripheries of the mirror, the first support beam, the first tuning fork-shaped vibrator, and the second support beam.

15. The optical reflection device according to claim 1, further comprising:
a third support beam having a fifth end connected to the first supporter and a sixth end located on an opposite side to the fifth end, the third support beam extending along a second center axis perpendicular to the first center axis;
a second tuning fork-shaped vibrator including
a second joining portion connected to the sixth end of the third support beam,
a third arm extending from the second joining portion while separated from the second center axis, and
a fourth arm extending from the second joining portion, the third arm and the fourth arm are symmetrical to each other about the second center axis;
a fourth support beam having a seventh end connected to the second joining portion of the second tuning fork-shaped vibrator and an eighth end located on an opposite side to the seventh end, the fourth support beam extending along the second center axis; and
a second supporter connected to the eighth end of the fourth support beam.

16. The optical reflection device according to claim 15, wherein
the third support beam has a meander shape extending from the fifth end to the sixth end while meandering along the second center axis, and
the fourth support beam has a meander shape extending from the seventh end to the eighth end while meandering along the second center axis.

17. The optical reflection device according to claim 1, further comprising:
a meander vibrating beam having a fifth end connected to the first supporter and a sixth end located on an opposite side to the fifth end, the meander vibrating beam extending and meandering along a second center axis perpendicular to the first center axis; and
a second supporter connected to the sixth end of the meander vibrating beam.

18. The optical reflection device according to claim 1, wherein
the first arm and the second arm are symmetrical to each other about the first center axis.

19. The optical reflection device according to claim 1, wherein
the first arm is separated from the first center axis.

20. The optical reflection device according to claim 1, wherein
the first driver element is provided on the first arm of the first tuning fork-shaped vibrator and the first joining portion of the first tuning fork-shaped vibrator.

21. The optical reflection device according to claim 1, wherein
the first arm of the first tuning fork-shaped vibrator is parallel to the first center axis.

22. The optical reflection device according to claim 1, wherein
the first arm of the first tuning fork-shaped vibrator is in a shape of a rectangular plate with one connected end extending from the first joining portion and another unconnected end.

23. An optical reflection device comprising:
a mirror having a reflection surface configured to reflect light;
a vibrating beam having a first end connected to the mirror and a second end located on an opposite side to the first end, the vibrating beam extending along a first center axis;
a first supporter connected to the second end of the vibrating beam;
a first support beam having a third end connected to the first supporter and a fourth end located on an opposite side to the third end, the first support beam extending along a second center axis perpendicular to the first center axis;
a tuning fork-shaped vibrator including
a joining portion connected to the fourth end of the first support beam,
a first arm extending from the joining portion while separated from the second center axis, and
a second arm extending from the joining portion, the first arm and the second arm are symmetrical to each other about the second center axis;
a second support beam having a third end connected to the first joining portion of the tuning fork-shaped vibrator and a fourth end located on an opposite side to the third end, the second support beam extending along the second center axis;
a second supporter connected to the fourth end of the second support beam; and
a first driver element provided on the first arm of the first tuning fork-shaped vibrator;
wherein the first arm and the second arm are formed on a virtual plane, and
the first driver element warps the first arm of the first tuning fork-shaped vibrator in a direction perpendicular to the virtual plane.

24. An optical reflection device comprising:
a mirror having a reflection surface configured to reflect light;
a first support beam having a first end connected to the mirror and a second end located on an opposite side to the first end, the first support beam extending along a first center axis;
a first tuning fork-shaped vibrator including
a first joining portion connected to the second end of the first support beam,
a first arm extending from the first joining portion, and
a second arm extending from the first joining portion;
a second support beam having a third end connected to the first joining portion of the first tuning fork-shaped vibrator and a fourth end located on an opposite side to the third end, the second support beam extending along the first center axis;
a first supporter connected to the fourth end of the second support beam; and
a first driver element provided on the first arm of the first tuning fork-shaped vibrator;
wherein the first driver element has a lower electrode layer provided on the first arm, a piezoelectric layer provided on the lower electrode layer, and an upper electrode layer provided on the piezoelectric layer.

* * * * *